(12) United States Patent
Truthseeker

(10) Patent No.: US 10,447,197 B2
(45) Date of Patent: Oct. 15, 2019

(54) SYSTEMS AND METHODS FOR MOUNTING ROOF-MOUNTED PHOTOVOLTAIC ARRAYS INCLUDING FLASHING AND ADHESIVE PADS

(71) Applicant: TECSI Solar, Inc., El Sobrante, CA (US)

(72) Inventor: Samuel Marcus-Flack Truthseeker, El Sobrante, CA (US)

(73) Assignee: TECSI Solar, Inc., El Sobrante, CA (US)

( * ) Notice: Subject to any disclaimer, the term of this patent is extended or adjusted under 35 U.S.C. 154(b) by 27 days.

(21) Appl. No.: 15/829,274

(22) Filed: Dec. 1, 2017

(65) Prior Publication Data

US 2018/0167020 A1 Jun. 14, 2018

Related U.S. Application Data

(60) Provisional application No. 62/434,327, filed on Dec. 14, 2016.

(51) Int. Cl.
*H02S 20/23* (2014.01)
*H02S 30/00* (2014.01)

(52) U.S. Cl.
CPC .............. *H02S 20/23* (2014.12); *H02S 30/00* (2013.01); *Y02B 10/12* (2013.01)

(58) Field of Classification Search
CPC ... E04D 13/14; E04D 13/1476; F16B 5/0258; F16B 2013/006; F16B 43/001; F24S 2025/021

See application file for complete search history.

(56) References Cited

U.S. PATENT DOCUMENTS

| | | | | |
|---|---|---|---|---|
| 3,331,272 A | * | 7/1967 | Hanneman | F16B 37/00 411/187 |
| 7,762,027 B1 | * | 7/2010 | Wentworth | F24S 25/61 52/173.3 |
| 8,209,914 B2 | * | 7/2012 | Stearns | E04D 13/10 52/58 |
| 8,756,881 B2 | | 6/2014 | West et al. | |
| 2006/0105142 A1 | * | 5/2006 | Shiga | C09J 7/22 428/136 |
| 2006/0239797 A1 | * | 10/2006 | Evanbar | F16B 5/0241 411/542 |
| 2011/0094652 A1 | * | 4/2011 | Duvekot | E04B 1/66 156/60 |
| 2012/0144760 A1 | * | 6/2012 | Schaefer | E04C 3/06 52/58 |
| 2012/0233958 A1 | | 9/2012 | Stearns | |
| 2012/0311846 A1 | * | 12/2012 | Twelves | B64C 9/02 29/525.04 |
| 2014/0230877 A1 | | 8/2014 | Goldberg et al. | |

(Continued)

*Primary Examiner* — Christine T Cajilig
(74) *Attorney, Agent, or Firm* — Armstrong Teasdale LLP

(57) ABSTRACT

A system for flashing a mount of a photovoltaic assembly on a surface includes a flashing including a lower surface and an upper surface. The flashing defines an opening to receive a fastener for securing the mount to the surface. The system also includes a first pad positioned along and attached to the lower surface and a second pad positioned along and attached to the upper surface. The first pad and the second pad extend across the opening. The first pad and the second pad include an adhesive and form a water resistant seal for the opening.

18 Claims, 23 Drawing Sheets

(56) References Cited

U.S. PATENT DOCUMENTS

| | | | |
|---|---|---|---|
| 2014/0305046 A1* | 10/2014 | Stearns | E04D 3/36 52/58 |
| 2015/0280639 A1* | 10/2015 | Atchley | H02S 20/23 248/237 |
| 2016/0134230 A1* | 5/2016 | Meine | H02S 20/23 52/698 |
| 2016/0176105 A1 | 6/2016 | Stanley | |
| 2016/0226435 A1* | 8/2016 | Almy | H02S 20/30 |

* cited by examiner

SYSTEMS AND METHODS FOR MOUNTING ROOF-MOUNTED PHOTOVOLTAIC ARRAYS INCLUDING FLASHING AND ADHESIVE PADS

CROSS REFERENCE TO RELATED APPLICATIONS

This application claims priority to U.S. Provisional Application No. 62/434,327, filed Dec. 14, 2016, which is hereby incorporated by reference in its entirety.

FIELD

This disclosure generally relates to flashing mounting systems for roofs and, more specifically, to flashing mounting systems for roof-mounted photovoltaic arrays.

BACKGROUND

Photovoltaic (PV) modules may be mounted to a surface of a structure such as a roof to form PV arrays. Each PV module may be mounted to the surface by mounts that secure the PV module to the surface and elevate the PV module above the surface. Sometimes, securing each mount to the surface causes one or more penetrations in the surface. Typically, photovoltaic arrays require numerous mounts and, thus, numerous penetrations in the surface. However, such penetrations may need to be sealed to prevent water intrusion into the structure through the penetrations. For example, flashing may be positioned on the mounts and the surface may be sealed using sealant materials. Sometimes, seals such as grommets may be used to seal openings in the flashing. However, the grommets require pressure to inhibit water intrusion through the openings and may deteriorate over time. Also, seals or barriers may be positioned to direct water flow away from the opening. However, the water may travel around the seals or barriers and through a drainage path towards the opening. In addition, forces such as wind can cause water to move upwards and overcome raised seals or barriers. Accordingly, such seals and barriers may not completely and reliably prevent water intrusion into the structure through the penetrations.

At least some flashing may be specially designed for use with the mounts. For example, some flashings include a raised interface to inhibit water flow into the penetrations. However, the raised interface increases the cost of materials and time required to assemble the flashing and requires the mount to have an increased size. The increased size or height of the mount increases the height of the entire PV array and increases the space between the PV array and the roof surface which can affect the aesthetics of the system. In addition, some flashings include an additional support to accommodate a seal, which further increases the cost to assemble the systems. Also, the flashing may experience stresses and deform when the flashing is connected to the surface.

Accordingly, there is a need for a system that simplifies the process to mount photovoltaic arrays and provides a reliable and robust water-resistant seal for penetrations.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a system for flashing a mount of a photovoltaic assembly on a surface includes a flashing with a lower surface and an upper surface. The flashing defines an opening to receive a fastener for securing the mount to the surface. The system also includes a first pad positioned along and attached to the lower surface and a second pad positioned along and attached to the upper surface. The first pad and the second pad extend across the opening. The first pad and the second pad include an adhesive and form a water resistant seal for the opening.

In another aspect, a system for flashing a mount of a photovoltaic assembly on a surface includes a flashing with a lower surface and an upper surface. The flashing defines an opening to receive a fastener for securing the mount to the surface. The system also includes a seal extending around the fastener when the fastener is positioned in the opening. The seal provides a first barrier to inhibit water intrusion through the opening. The system further includes a pad attached to one of the lower surface and the upper surface, wherein the pad provides a second barrier to inhibit water intrusion through an interface of the flashing and the surface.

In yet another aspect, a system for flashing a mount of a photovoltaic assembly on a surface includes a flashing with a lower surface and an upper surface. The flashing defines an opening to receive a fastener for securing the mount to the surface. The system also includes a pad disposed on one of the lower surface and the upper surface by adhesive. The pad is compressible and provides a seal to inhibit water intrusion through the opening.

In another aspect, a system for flashing a mount of a photovoltaic assembly on a roofing surface includes a flashing with a lower surface and an upper surface. The flashing defines an opening to receive a fastener for securing the mount to the surface. The system also includes a pad attached to the lower surface by adhesive. The pad is U-shaped and provides a barrier to inhibit water intrusion between the roofing surface and the lower surface of the flashing.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

Figure 1:
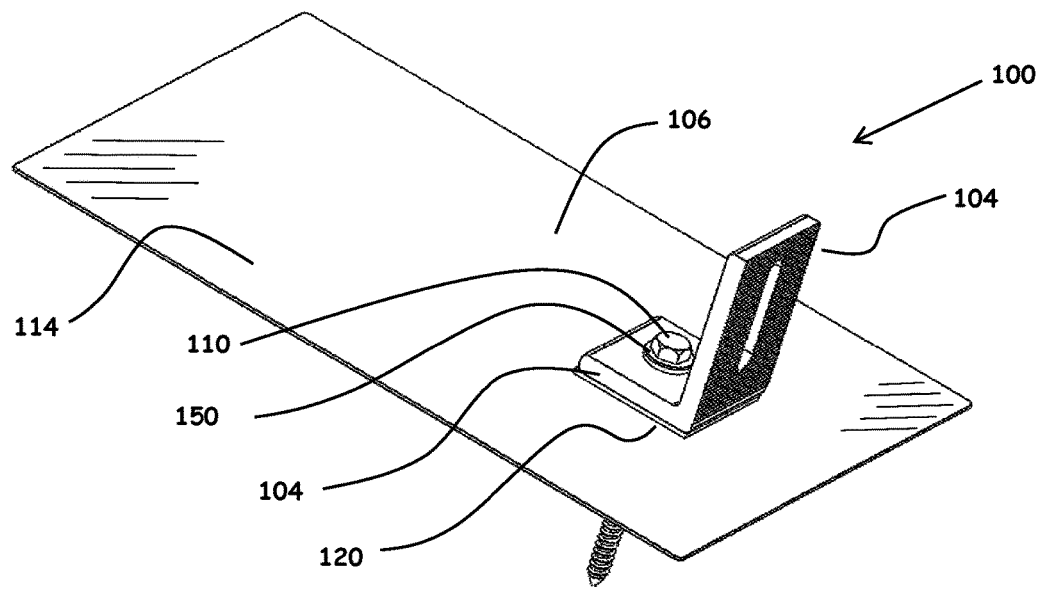
FIG. 1 is a perspective view of an installed system 100 for mounting photovoltaic modules and support structures.
Figure 2:
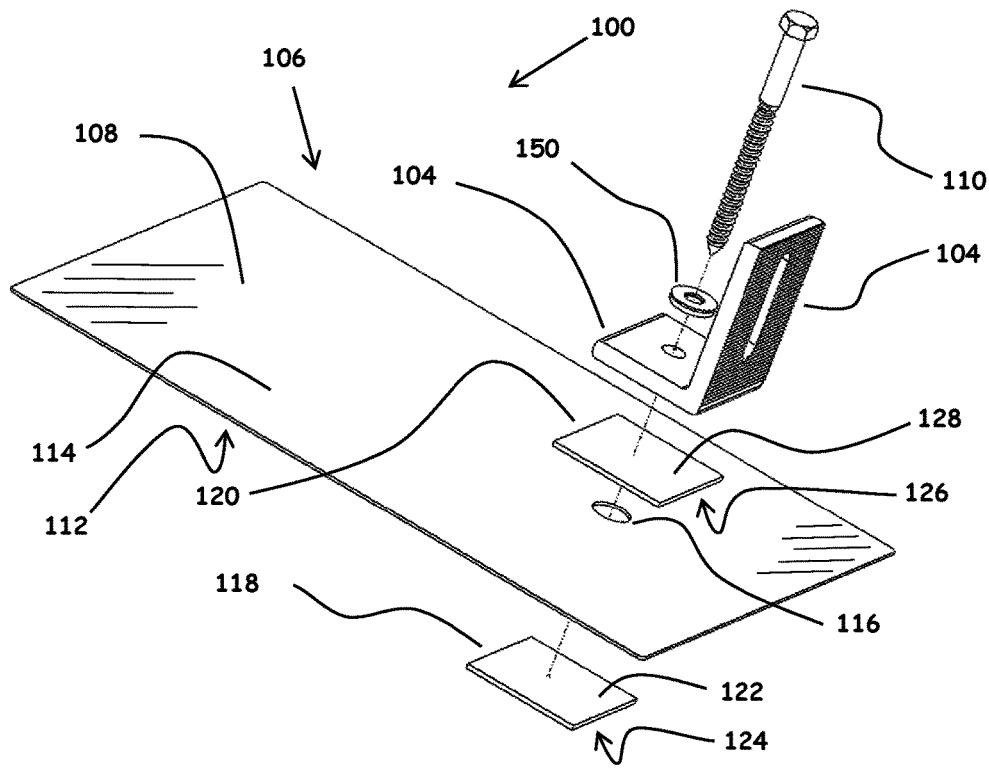
FIG. 2 is an exploded perspective view of the system shown in FIG. 1.
Figure 6:
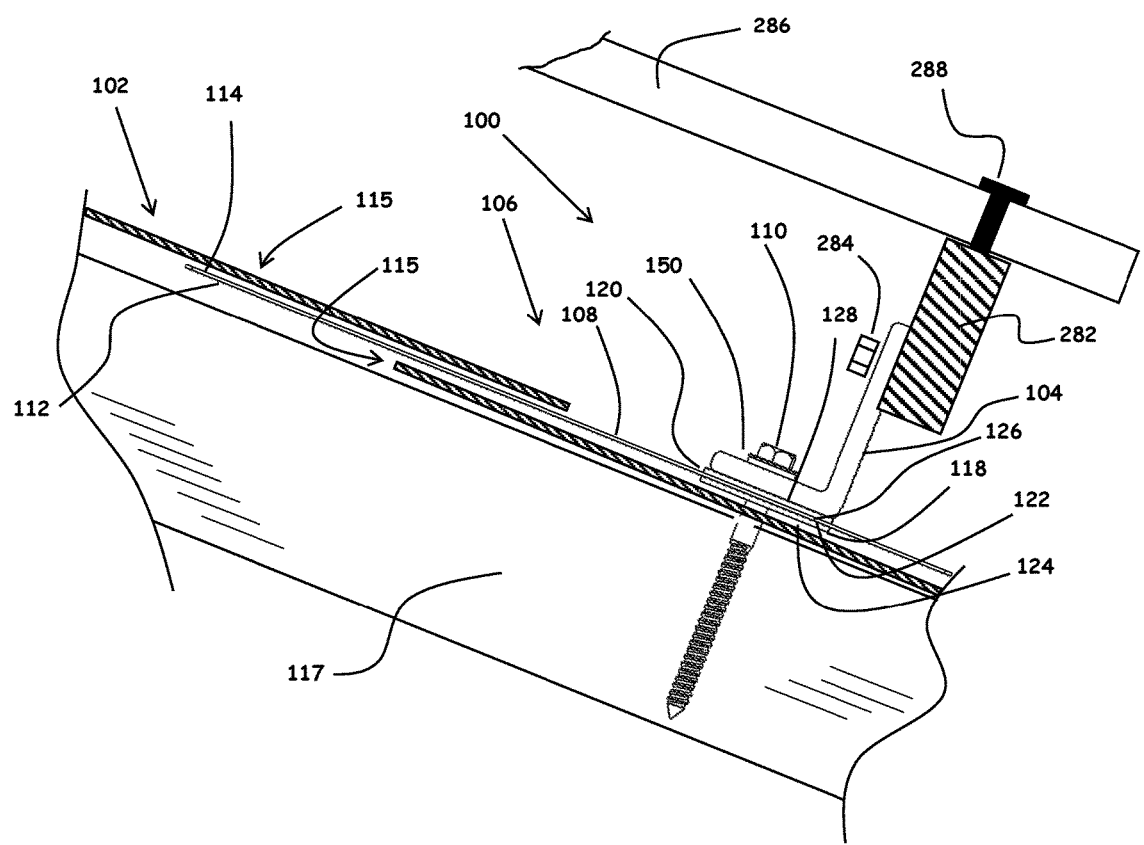
FIG. 6 is a sectional view of a system for mounting photovoltaic (PV) modules on a surface of a structure.

FIG. 1 is a perspective view of an as installed system 100 for mounting photovoltaic modules and support structures. The system 100 includes a mount 104, a fastener 110, a sealing washer 150, and a flashing assembly 106. FIG. 2 is an exploded perspective view of the system 100 including the flashing assembly 106. FIG. 6 is a sectional view of the as installed system 100 for mounting photovoltaic (PV) modules and photovoltaic support structures on a surface 102 of a structure. The structure may be, for example, a building having a sloped or flat roof or any other structure suitable for mounting PV modules. In the example, the structure is a roof and includes shingles 115 and supports 117.

Figure 3:
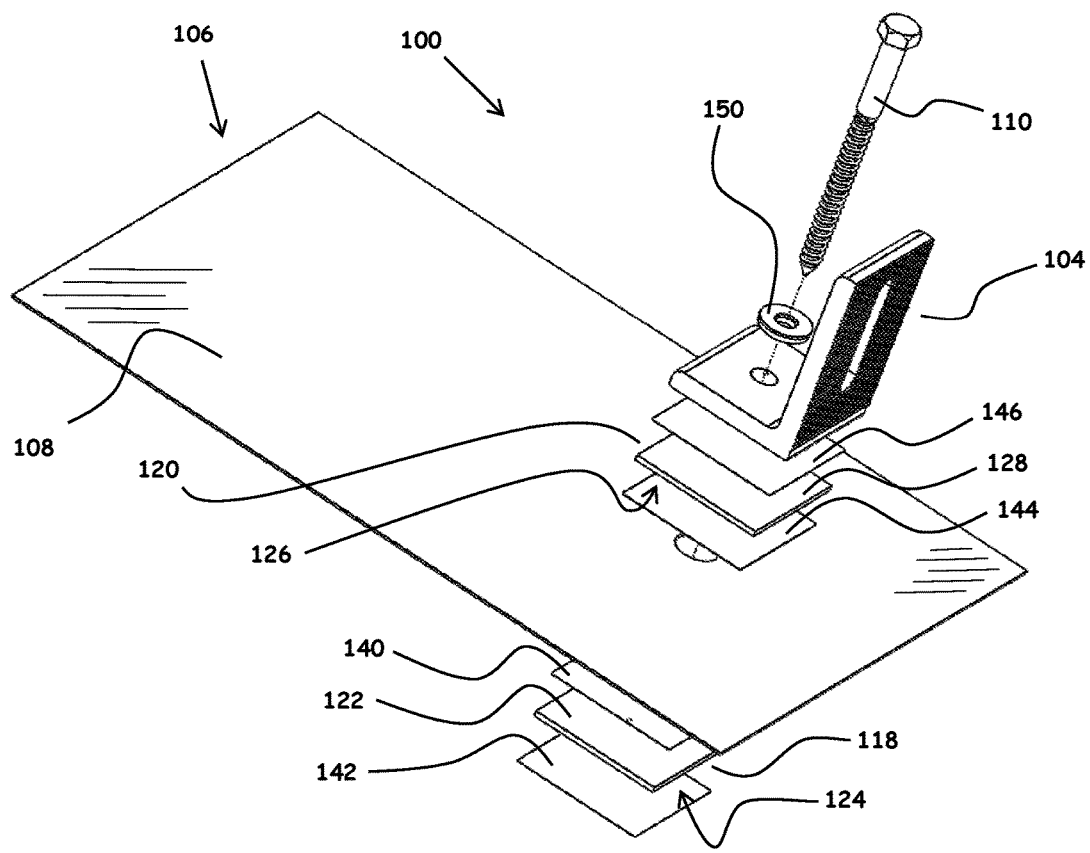
FIG. 3 is an exploded perspective view of all components of the system shown in FIGS. 1 and 2 prior to assembly.
Figure 4:
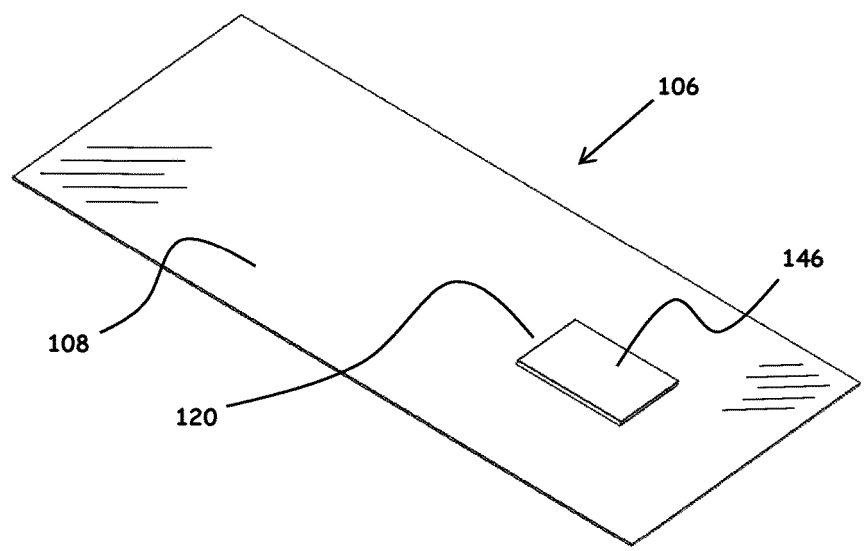
FIG. 4 is a perspective view of the flashing assembly of the system shown in FIGS. 1-3.
Figure 5:
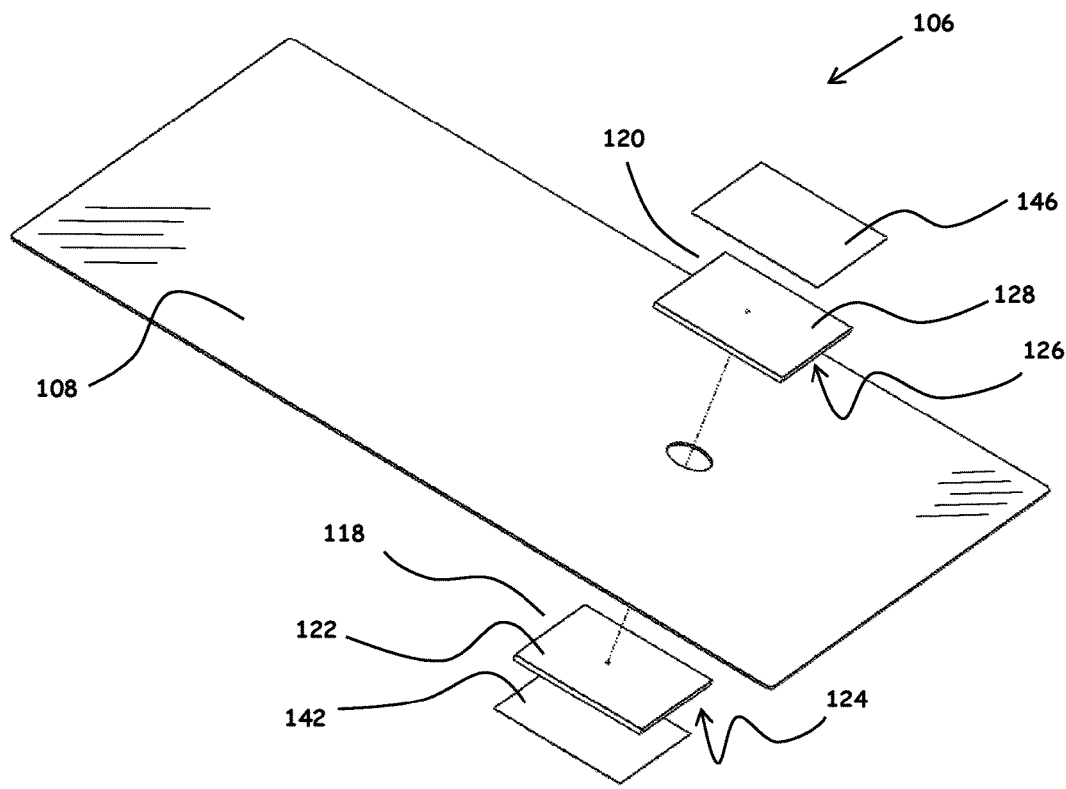
FIG. 5 is an exploded view of the flashing assembly shown in FIG. 4.

FIG. 3 is an exploded perspective view of all the components of the system 100 prior to assembly. FIG. 4 shows the perspective view of the flashing assembly 106. FIG. 5 shows an exploded view of the flashing assembly 106. The flashing assembly 106 includes a flashing 108, a first pad 118, and a second pad 120. A second release sheet 142 may cover a second attachment surface 124 of the first pad 118 and a fourth release sheet 146 may cover a fourth attachment surface 128 of the second pad 120. The release sheets 142, 146 may be shipped with the flashing assembly 106 to protect the attachment surfaces 124, 128 until the attachment surfaces 124, 128 are exposed during installation of the system 100. In addition, the release sheets 142, 146 may prevent the first pad 118 and the second pad 120 from sticking to adjacent flashing assemblies 106 when multiple flashing assemblies are packaged together.

In the example, the mount 104 is a bracket. Fasteners 110 are secured through the mount 104, the flashing assembly 106, and into the supports 117 of the structure. In other embodiments, the system 100 may include any mount 104 and/or combination of fasteners 110 that enables the system 100 to operate as described.

As an example, embodiments of the systems and methods are described in the context of PV modules. However, the flashing assemblies 106 may be used to flash any penetrations in surfaces. For example, the described embodiments may be used for penetrations in roofs such as penetrations for heating, venting, and air-conditioning systems, plumbing vents, chimneys, mechanical attachments, and any other components requiring penetrations in roofs. The term "penetration" refers to an opening in a surface.

The flashing assembly 106 may be connected to the mount 104 and positioned over any openings in the surface 102. As described further below, the flashing assembly 106 includes one or more sticky pads 118, 120 to provide a water-resistant seal for any penetrations in the surface. The pads 118, 120 are sticky, i.e., the pads 118, 120 attach to surfaces. As used herein, the term "sticky" refers to a tendency to attach to surfaces. The pads 118, 120 provide a robust seal between surfaces and completely seal the penetrations in the surface 102. In contrast, known systems form a torturous or raised path for the water. The pads 118, 120 provide a seal without requiring the torturous or raised path. In addition, the pads 118, 120 may attach to all surfaces in the system 100 and provide a seal without requiring a constant pressure. As a result, the embodiments decrease the number of parts and the part complexity required to provide a water-resistant seal. In addition, the pads 118, 120 maintain a seal for a longer time than systems that require pressure to be applied constantly to maintain the seal.

As shown in FIG. 6, when the mount 104 is secured to the surface 102, a PV module 286 may be attached directly to the mount 104. In another example, a rail or support structure 282 may be attached to the mount 104 by a fastener 284 and one or more PV modules 286 may be attached to each rail 282 by a fastener 288. In other embodiments, the PV modules 286 may be mounted in any manner that enables the PV module to function as described. For example, the PV module 286 and/or the rail 282 may be directly attached to the mount 104. In addition, each PV module may be attached directly or indirectly to a plurality of mounts 104.

Referring to FIG. 2, the flashing assembly 106 includes flashing 108 and pads 118, 120. The flashing 108 includes a lower surface 112 and an upper surface 114. The flashing 108 may be positioned between layers of the surface 102 as shown in FIG. 6. For example, in this embodiment, the flashing 108 extends between shingles 115 of the surface 102 in an overlapping arrangement. In some embodiments, the pads 118, 120 allow the flashing 108 to be positioned on the top of surface 102 because the pads 118, 120 provide a water-resistant seal without requiring an overlap of the surface 102 and the flashing 108. As shown in FIG. 2, the flashing 108 defines an opening 116 to receive a fastener 110 for securing the mount 104 to the surface 102.

With reference to FIGS. 2 and 3, a first pad 118 is attached to the lower surface 112 and a second pad 120 is attached to the upper surface 114. The first pad 118 and the second pad 120 extend across and completely cover the opening 116 on opposite sides of the flashing 108. Moreover, the first pad 118 and the second pad 120 contact each other at the opening 116 and bond together to form a unitary structure. As a result, the first pad 118 and the second pad 120 seal the opening 116. Accordingly, the flashing assembly 106 is configured to receive fasteners 110 but does not include any unsealed openings. In contrast, known systems include unsealed holes that receive fasteners and must be sealed after installation. In the example, the first pad 118 and the second pad 120 form a membrane that must be penetrated by the fastener 110 and that automatically forms a seal around the fastener 110 when the fastener 110 is positioned in the opening 116.

In addition, the first pad 118 and the second pad 120 attach to the fastener 110 when the fastener 110 extends through the opening 116. The first pad 118 and the second pad 120 may be pulled into the penetration in the surface 102 and seal the penetration when the fastener 110 is secured to the surface 102. Accordingly, the first pad 118 and the second pad 120 provide a water-resistant seal for the opening 116 and between the flashing assembly 106 and the surface 102 and the supports 117. Also, the flashing assembly 106 does not require any field applied sealant to ensure water resistance at the penetration when the mount 104 is secured using the fastener 110. In contrast, known systems require sealant to be field applied to produce a proper water resistant penetration. In other embodiments, the flashing assembly 106 may include any pad 118, 120 that enables the flashing assembly 106 to function as described. For example, in some embodiments, one or more pads 118, 120 may be positioned on the lower surface 112 and/or the upper surface 114.

The flashing 108 may be any shape and size. In this embodiment, the flashing 108 is a rectangle and is planar. The flashing 108 may include any materials including, for example and without limitation, metals, polymeric materials, and rubber. In other embodiments, the flashing assembly 106 may include any flashing 108 that enables the flashing assembly 106 to function as described.

The pads 118, 120 allow the opening 116 to be oversized because the pads 118, 120 completely seal the opening 116. Specifically, the opening 116 may have a diameter that is greater than the diameter of the fastener 110. The diameter of the opening 116 may be greater than the diameter of the fastener 110 by a percentage of the diameter of the fastener 110 in a range of about 10% to about 1,000%, or about 15% to about 50%. In the example, the diameter of the opening 116 is at least 20% greater than the diameter of the fastener 110. In contrast, current systems include openings that are sized to tightly fit the fasteners 110 because any excess space must be sealed after the fastener 110 is installed.

Accordingly, in this embodiment, the fastener 110 does not have to be positioned precisely to fit into the opening 116 and align the fastener 110 with the target location on the surface 102. The target location can be defined by a pilot hole or by some other means. As a result, the time required to secure the system 100 and the flashing assembly 106 to the surface 102 is significantly reduced compared to previous systems where near perfect alignment between the opening and the target location was required. Accordingly, the oversized opening 116 allows blind installation (i.e., installation without seeing the target location) and reduces the time required to search for a target location. In other embodiments, the flashing 108 may include any opening 116 that enables the flashing assembly 106 to function as described. For example, in some embodiments, the flashing assembly 106 may include more than one opening 116 (see, e.g., openings 237 shown in FIG. 14) and the pads 118, 120 may seal each opening 116. In addition, the opening(s) 116 can be any shape including circles, ovals, slots, rectangles, trapezoids, pentagons, hexagons, and/or shapes including any number of sides and each opening may receive more than a single fastener.

FIG. 5 is an exploded view of the flashing assembly 106. The flashing assembly 106 includes a first pad 118 and a second pad 120. The first pad 118 has a first attachment surface 122 and a second attachment surface 124 opposite the first attachment surface 122. The second pad 120 has a third attachment surface 126 and a fourth attachment surface 128 opposite the third attachment surface 126. Accordingly, the first pad 118 and the second pad 120 are double-sided adhesive pads.

Prior to installation of the flashing assembly 106, the first attachment surface 122 may be attached to the lower surface 112 of the flashing 108 and the third attachment surface 126 may be attached to the upper surface 114. Accordingly, the flashing 108 is "sandwiched" between the first pad 118 and the second pad 120. To attach the flashing assembly 106 to the surface 102 and to the mount 104, the second attachment surface 124 may be attached to the surface 102 and the fourth attachment surface 128 may be attached to the mount 104. In other embodiments, the first pad 118 and the second pad 120 may be attached to the flashing 108, the mount 104, and/or the surface 102 in any manner that enables the flashing assembly 106 to function as described.

The first pad 118 and the second pad 120 may be a free form adhesive such as a sticky putty or a butyl type tape. In the example, the first pad 118 and the second pad 120 are made entirely of an adhesive material. In other embodiments, the pads 118 and 120 may be a rubber, foam, and/or other polymeric material. In other embodiments, adhesives may be included on one or both sides of the pads 118, 120. For example, the pads 118, 120 may include an adhesive on the attachment surfaces 122, 124, 126, 128 that is configured to attach to the flashing 108, the mount 104, and the surface 102 (shown in FIG. 6). In addition, the first pad 118 may be designed to seal asphalt, asphalt shingles, concrete tiles, clay tiles, rubber, modified bitumen roofing underlayments, roofing membranes such as TPO (thermoplastic polyefin), EPDM (ethylene propylene diene terpolymer), PVC (polyvinyl chloride), and/or any other roofing surface. In other embodiments, the flashing assembly 106 may include any pad 118, 120 that enables the flashing assembly 106 to function as described.

In another embodiment, the first pad 118 and the second pad 120 may not be attached to the flashing 108 to form the flashing assembly 106 prior to installation of the flashing assembly 106. For example, the first pad 118 and the second pad 120 can be shipped with or separately from the flashing 108 and be attached to the flashing 108 during installation of the system 100. To prevent the first pad 118 and the second pad 120 from attaching to materials prior to installation, the first pad 118 and/or the second pad 120 may be protected by release sheets as shown in FIG. 3. For example, the first pad 118 and the second pad 120 may be protected by a first release sheet 140, a second release sheet 142, a third release sheet 144, and a fourth release sheet 146 (shown in FIG. 3). The first release sheet 140 may be positioned on the first attachment surface 122 and the second release sheet 142 may be positioned on the second attachment surface 124 of the first pad 118. The third release sheet 144 may be positioned on the third attachment surface 126 and the fourth release sheet 146 may be positioned on the fourth attachment surface 128 of the second pad 120. The first release sheet 140 may be removed from the first attachment surface 122 and the third release sheet 144 may be removed from the third attachment surface 126 to allow the first pad 118 and the second pad 120 to attach to the flashing 108 and form the flashing assembly 106.

In reference to FIG. 5, the second release sheet 142 may remain over the second attachment surface 124 to prevent objects attaching to the second attachment surface 124 prior to installation of the flashing assembly 106. The fourth release sheet 146 may remain over the fourth attachment surface 128 to prevent objects attaching to the fourth attachment surface 128 prior to installation of the flashing assembly 106. In this embodiment, each release sheet 140, 142, 144, 146 may comprise a plastic or non-adhesive sheet that covers the attachment surfaces 122, 124, 126, 128. In some embodiments, the release sheets 142, 146 may include a grip or tab to facilitate removal of the release sheets 142, 146 as shown in FIG. 20.

Figure 20:
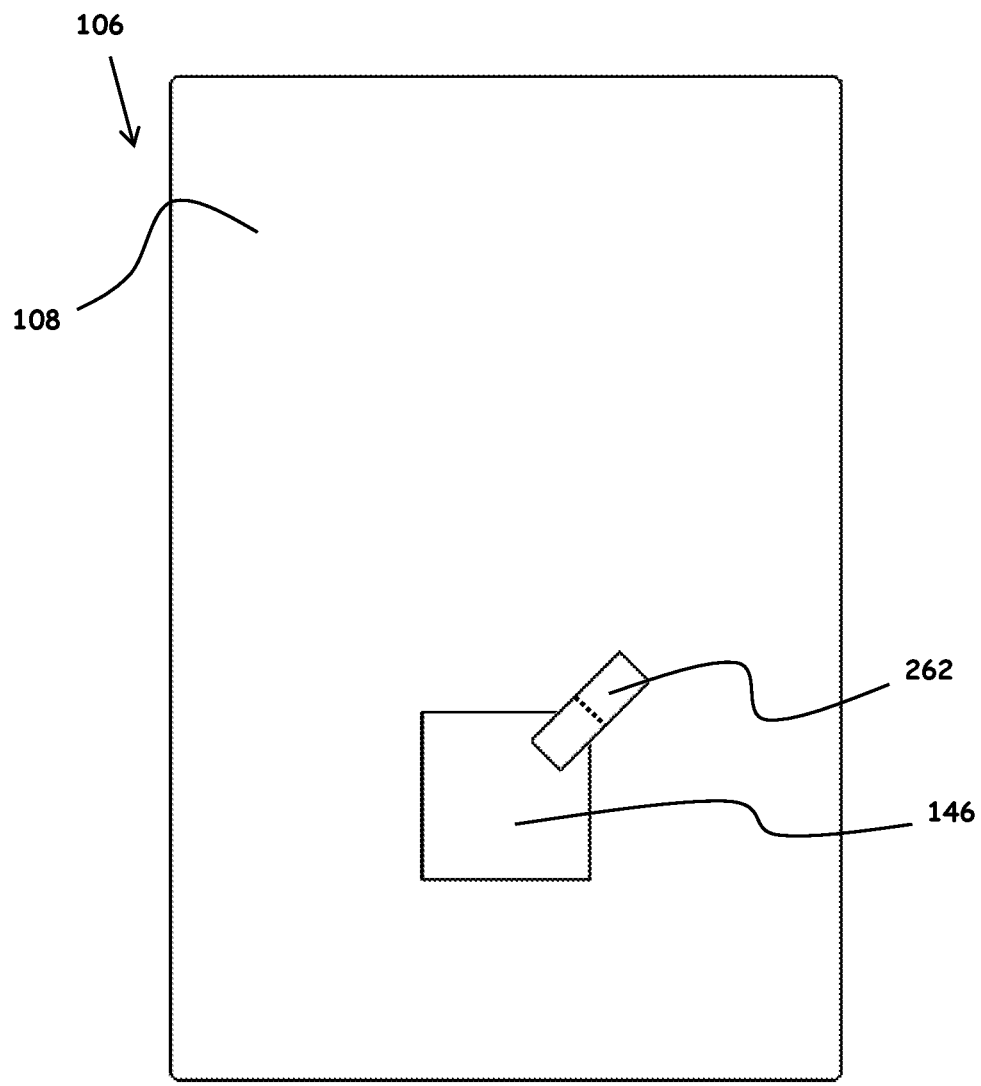
FIG. 20 is a top view of a flashing assembly with a pull-tab.
Figure 21:
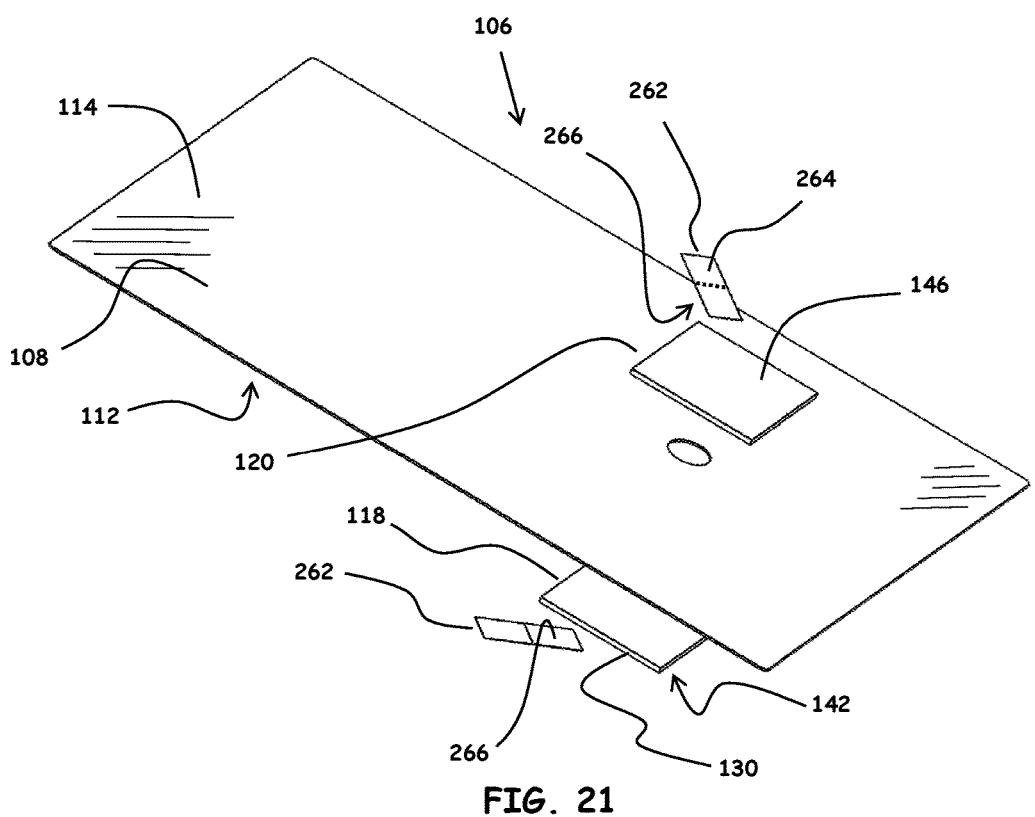
FIG. 21 is a partially exploded perspective view of the flashing assembly shown in FIG. 20.
Figure 22:
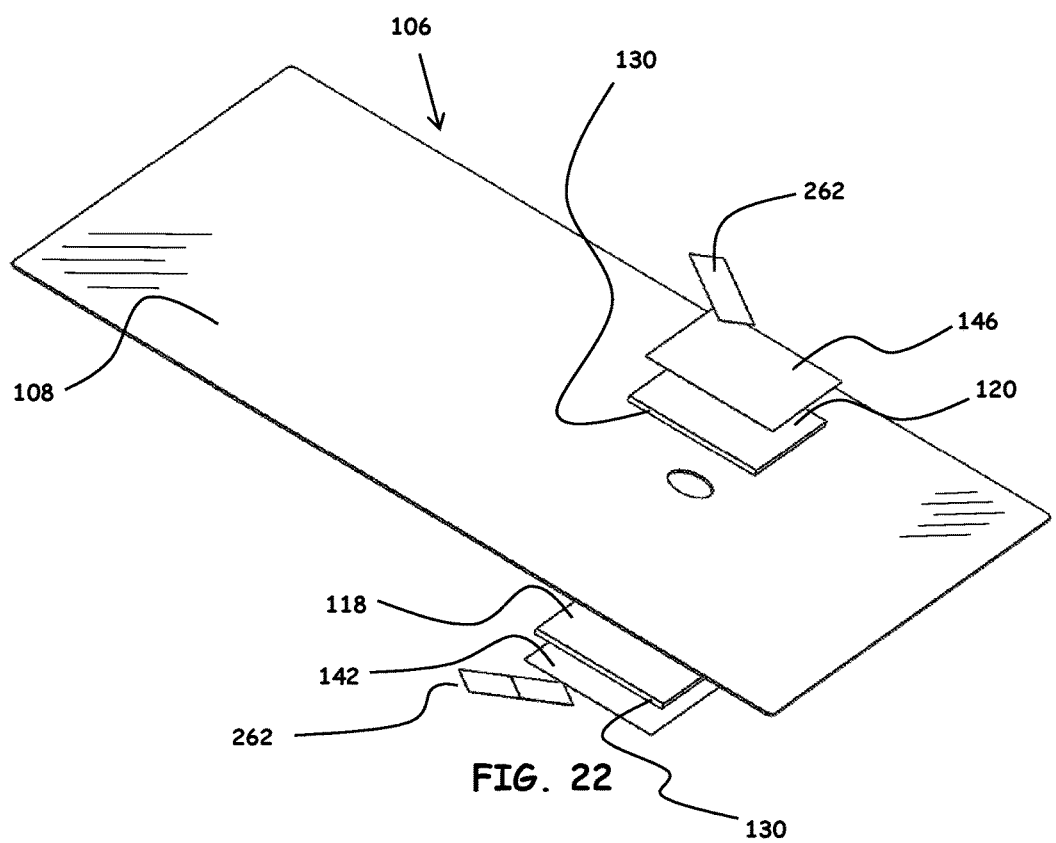
FIG. 22 is a fully exploded perspective view of the flashing assembly shown in FIGS. 20 and 21.

FIG. 20 is a top view of the flashing assembly 106 with a pull-tab 262. As shown in FIGS. 21 and 22, the pull-tab 262 includes an adhesive surface 266 that sticks to the top or the exposed surface of the release sheets 142, 146 and a non-adhesive section 264 that may be grasped by the installer to remove the release sheets 142, 146. FIG. 21 is a partially exploded perspective view of the flashing assembly 106 shown in FIG. 20. FIG. 22 is a fully exploded perspective view of the flashing assembly 106 shown in FIGS. 21 and 22 and showing release sheets 142, 146. The pull-tabs 262 allow for easy removal of the release sheets 142, 146 from the first and second pads 118, 120 because the pull-tabs 262 provide a location for the installer to grasp without contacting adhesive. Accordingly, the pull-tabs 262 allow the pads 118, 120 to include sticky materials with increased waterproof capabilities without the installer's fingers sticking to the pads 118, 120. As a result, the pull-tabs 262 reduce the time and materials required to install the system and reduce the possibility of damage to the pads 118, 120 during removal of the release sheets 142, 146.

In another embodiment, the release sheet 142, 146 may be oversized relative to the respective attachment surfaces 124, 128 such that a portion of the release sheet is exposed for a user to grasp. Besides allowing for easy release, the oversized release sheets 142, 146 may cover the edges 130 of the pad 118, 120 that can stick to other surfaces or to other flashing assemblies 106 when the flashing assemblies 106 are packaged.

Figure 23:
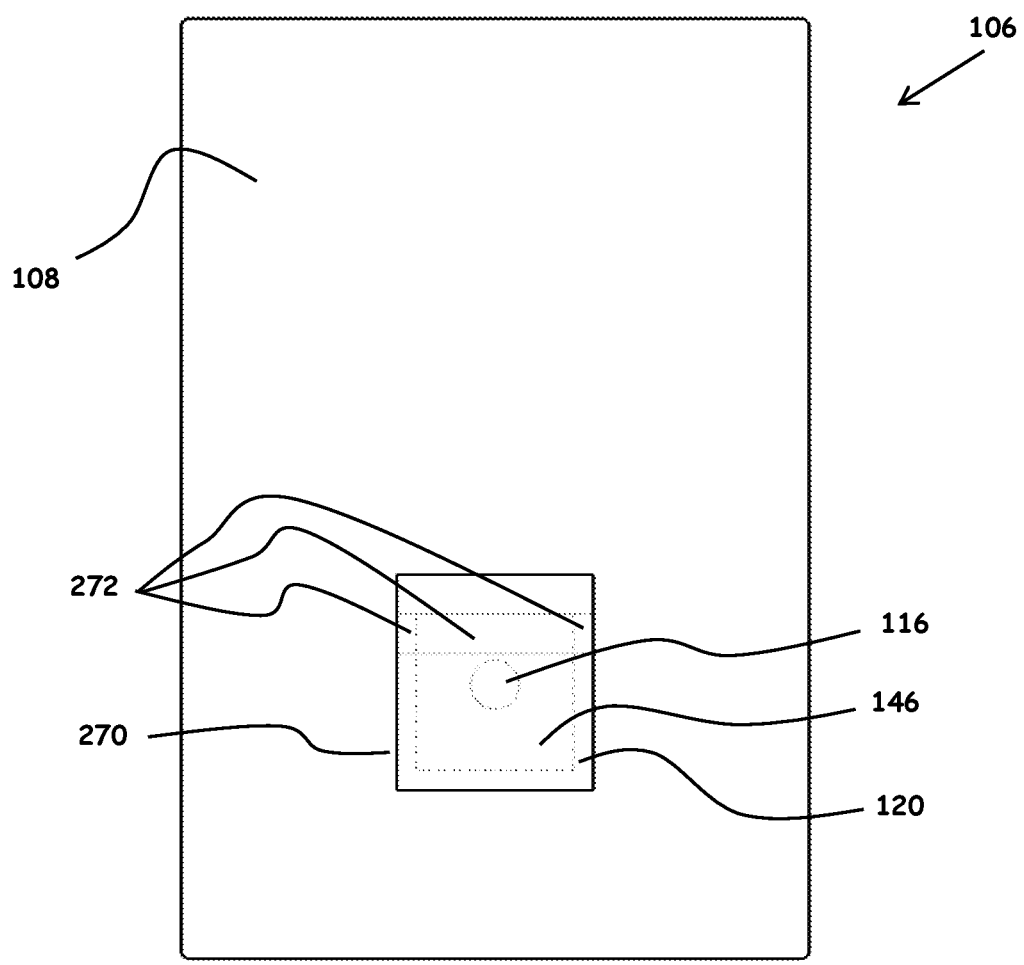
FIG. 23 is a top view of a flashing assembly with an oversized release sheet.
Figure 24:
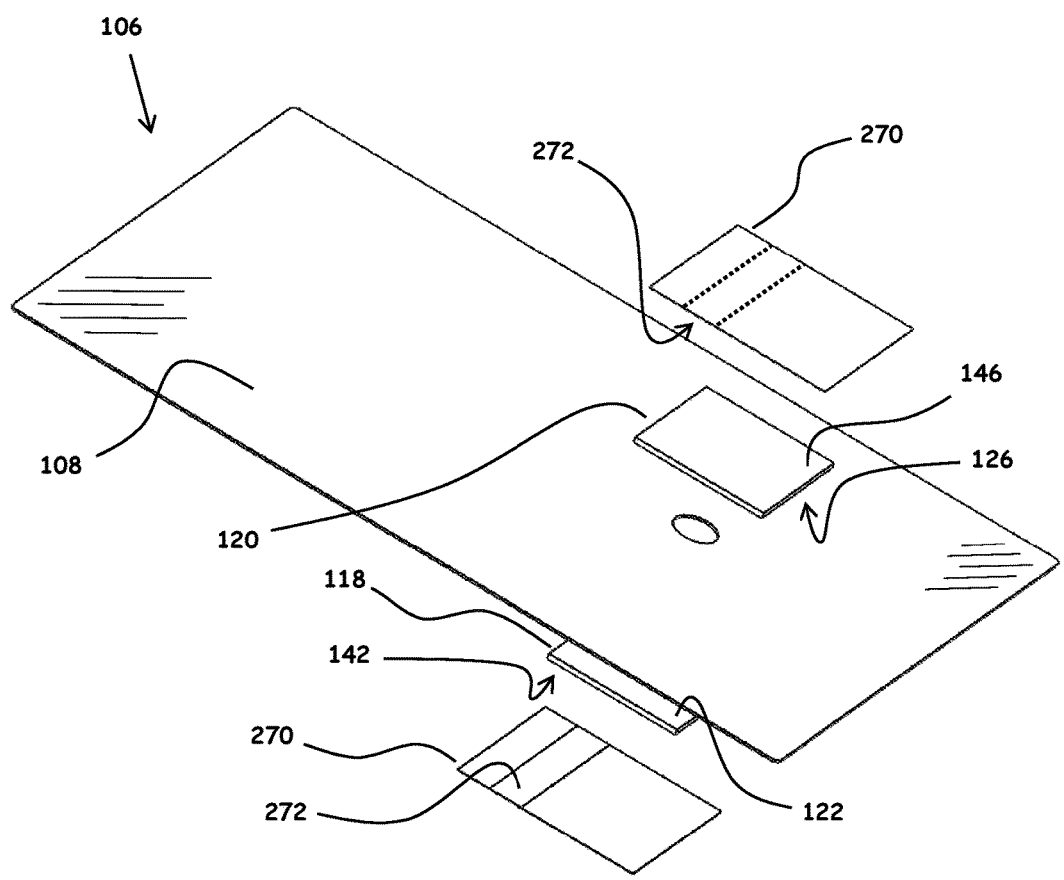
FIG. 24 is a partially exploded perspective view of the flashing assembly shown in FIG. 23.
Figure 25:
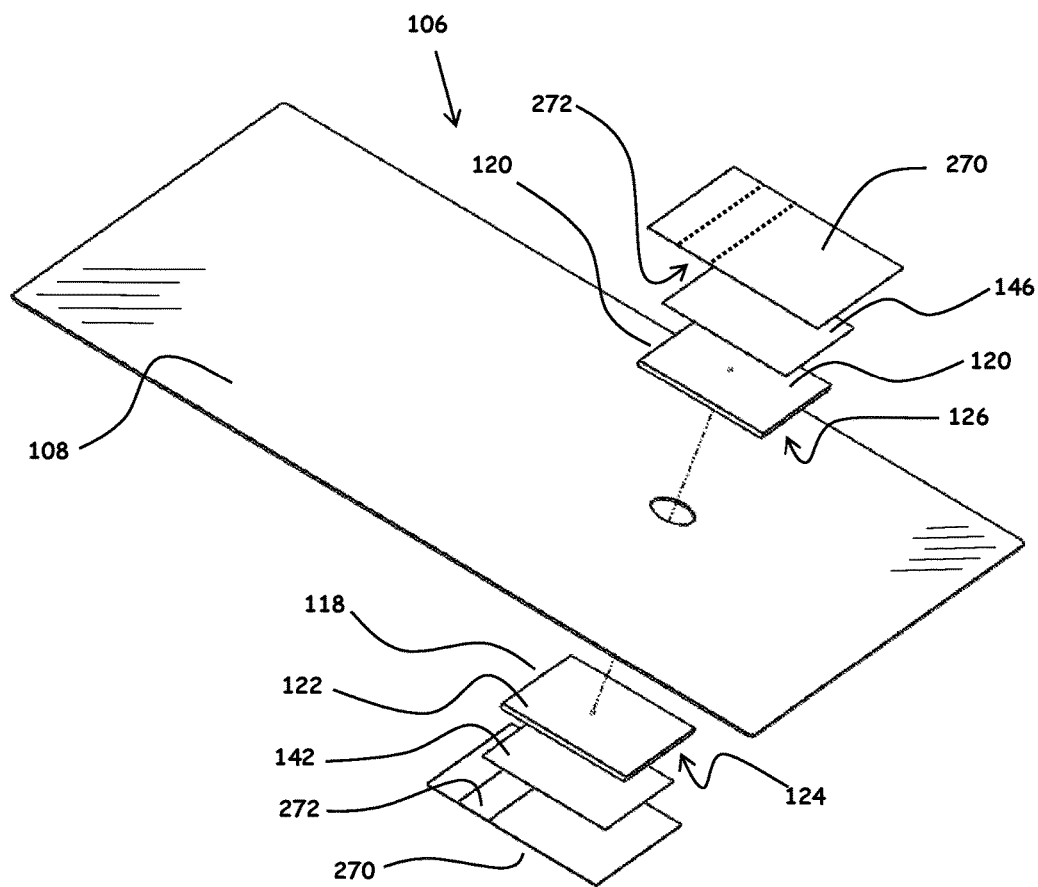
FIG. 25 is a fully exploded perspective view of the flashing assembly shown FIGS. 23 and 24.

In another embodiment shown in FIGS. 23, 24, and 25, an oversized release sheet 270 can include an adhesive strip 272 that sticks to the second and fourth release sheets 144, 148. Accordingly, the oversized release sheet 270 can act as a pull-tab and an edge 130 protector. FIG. 23 is a top view of the flashing assembly 106 with the oversized release sheet 270. FIG. 24 is a partially exploded perspective view of the flashing assembly 106 shown in FIG. 23 with the second and fourth release sheets 142 and 146 attached to the pads 118 and 120, respectively. FIG. 25 is a fully exploded perspective view of the flashing assembly 106 shown FIG. 23.

The oversized release sheet 270 is rectangular and the adhesive strip 272 extends across a width of the oversized release sheet 270. In other embodiments, the system 100 may include any oversized release sheet 270 that enables the system 100 to operate as described. For example, in some embodiments, the oversized release sheet 270 may be any suitable shape.

Figure 26:
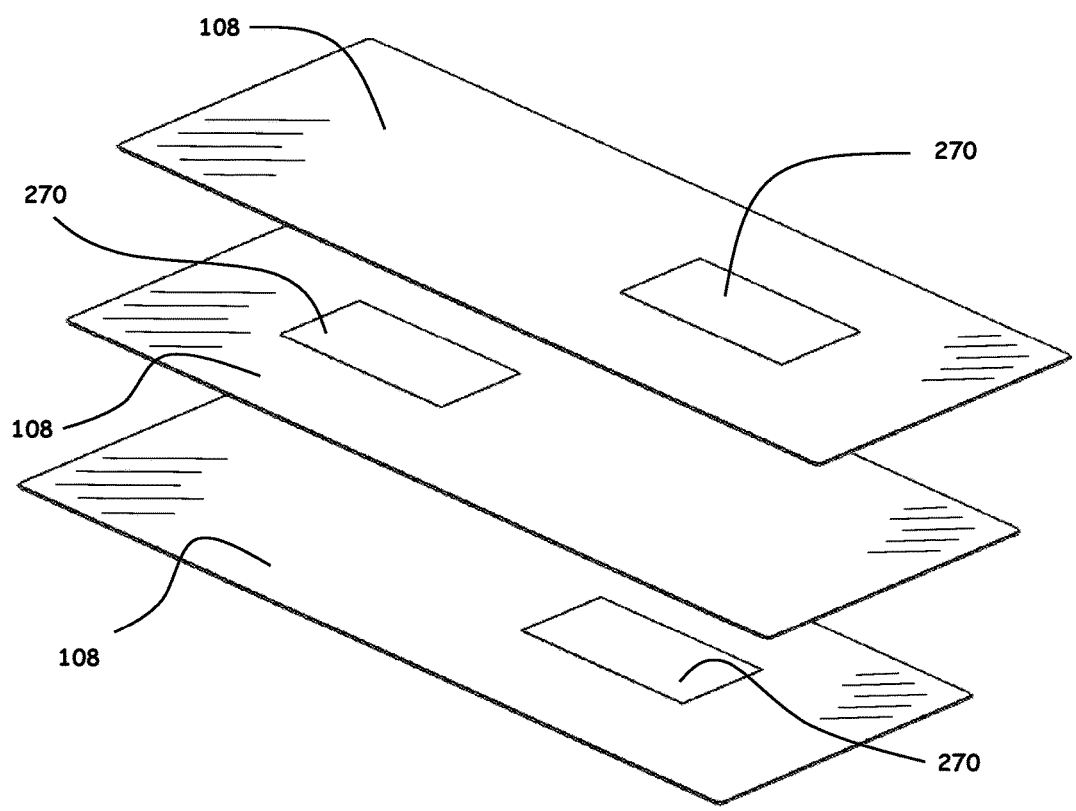
FIG. 26 is a perspective view of flashing assemblies.
Figure 27:
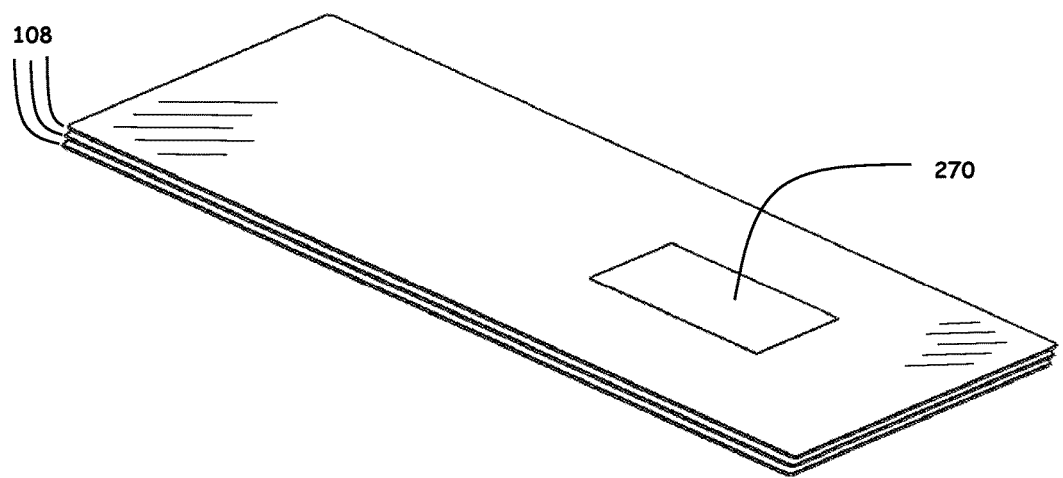
FIG. 27 is a perspective view of the flashing assemblies shown in FIG. 26 in a stacked arrangement.

In another embodiment, an oversized release sheet 270 without the adhesive strip 272 is attached directly to the second and fourth attachment surfaces 124 and 128 of the first and second pads 118 and 120. The oversized release sheets 270 prevent the edges 130 of the pads 118 and 120 from sticking to the adjacent flashing assemblies 106. FIG. 27 is a perspective view of the flashing assemblies 106 stacked for packaging with maximum density. FIG. 26 is an exploded view of the flashing assemblies 106 shown in FIG. 27. In other embodiments, the flashing assembly 106 may include any release sheet 140, 142, 144, 146 that enables the flashing assembly to function as described. The release sheets 140, 142, 144, 146, and 270 allow the first and second pads 118, 120 to be protected and prepared prior to installation and enable the use of highly sticky materials that result in superior waterproofing performance in comparison to known systems.

In reference to FIG. 6, the first pad 118 and the second pad 120 are compressible. As used herein, the term "compressible" refers to a material that changes volume in response to changes in pressure. Suitably, the first pad 118 and the second pad 120 form a water-resistant seal when compressed. In this embodiment, the first pad 118 is compressed between the flashing 108 and the surface 102 when the flashing assembly 106 is attached to the surface 102. The first pad 118 conforms to imperfections, to textures, and around aggregate granules in the roof surface 102 and adheres and seals to the surface 102. The second pad 120 is compressed between the flashing 108 and the mount 104 when the flashing 108 is connected to the mount 104. The second pad 120 conforms to, fills, and adheres to imperfections and nonuniform features of the contact surface of the mount 104. In addition, the first pad 118 is compliant and conforms to any gap between the surface 102 and the flashing 108 to maintain the water-resistant seal when the flashing assembly 106 experiences deflection caused by loads on the system 100. Also, the first pad 118 slightly raises the flashing 108 above the surface 102 after installation. This aspect removes loading on the portion of the flashing 108 beyond the mount that can cause the flashing 108 to warp which reduces the seal of the assembly. The removed loading removes the need for strengthening ribs within the flashing 108 or additional and expensive stabilization pucks which increase the cost of known products. As a result, the flashing assembly 106 provides a lower cost and simpler product with a more repeatable and robust water-resistant seal. In addition, the water-resistant seal is maintained after an initial activation pressure is removed.

The first pad 118 and the second pad 120 may have any suitable shape and size. For example, in this embodiment, the first pad 118 and the second pad 120 are rectangular. In other embodiments, the first pad 118 and/or the second pad 120 may be a square, a circle, a triangle, a trapezoid, an oval, a rectangle, a pentagon, a hexagon, or any other sided multi-sided shape. In addition, the first pad 118 and the second pad 120 are flat or planar. The first pad 118 and the second pad 120 may each have a thickness in a range of about 0.01 inches (in.) to about 0.5 in or about 0.03 in. to about 0.25 in. or about 0.03 in. to about 0.125 in. or about 0.03 in. to about 0.08 in. In other embodiments, the pads 118, 120 may be non-planar. For example, in some embodiments, the first pad 118 and/or the second pad 120 may be conical. Also, in some embodiments, the shape of the first pad 118 and/or the second pad 120 may match the shape of the flashing 108 and/or the mount 104 to form a tortuous path, to provide a better mating surface, and/or to fill in gaps between components which inhibit water intrusion into the structure through the opening 116.

In this embodiment, a sealing washer 150 is positioned under a head of the fastener 110 as shown in FIG. 2. The sealing washer 150 provides a seal between the fastener 110 and the mount 104 to inhibit water ingress along the fastener 110. The first pad 118 and the second pad 120 also seal around the fastener 110 and provide a second layer of protection. Known systems rely upon the sealing washer 150 as the critical or only sealing component. In contrast, the first pad 118 and the second pad 120 prevent water from entering the penetration in the surface 102 if water flows past the sealing washer 150. Accordingly, the sealing washer 150 is not the critical sealing component. In some embodiments, the sealing washer 150 may be omitted.

To install the system 100, the flashing assembly 106 may be provided at a desired installation site in a pre-installation or first configuration. In the first configuration, shown in FIG. 4, the first pad 118 is attached to the lower surface 112 of the flashing 108 by removing the first release sheet 140 from the first attachment surface 122. The second pad 120 is attached to the upper surface 114 of the flashing 108 by removing the third release sheet 144 from the third attachment surface 126. An exploded view of the first configuration is shown in FIG. 5. To switch the flashing assembly 106 into an installation or second configuration, the second release sheet 142 and the fourth release sheet 146 are removed from the second attachment surface 124 and the fourth attachment surface 128, respectively, as shown in FIG. 2. FIG. 3 is an exploded view of all components of the system 100. The flashing 108 is positioned along the surface 102 and the second attachment surface 124 is attached to the surface 102. The flashing assembly 106 seals any corresponding pilot holes or penetrations in the surface 102 when the flashing 108 is attached to the surface 102. Accordingly, the flashing assembly 106 prevents water ingress through the penetrations after the flashing 108 is attached to the surface 102 even if the installation of the system 100 is not immediately completed. Accordingly, in contrast to known systems, extra steps and components are not required to seal the penetrations if the installation is halted such as if the installers leave the installation site due to rain.

To secure the mount 104 to the surface 102, the fourth attachment surface 128 is attached to the mount 104. The fastener 110 is positioned through an opening in the mount 104 and through the opening 116 in the flashing 108. The first pad 118 and the second pad 120 seal around the fastener 110 and form a water-resistant seal without requiring pressure. The fastener 110 is tightened and, as a result, the first pad 118 and the second pad 120 are compressed. One or more PV modules may be attached to the mount 104. In other embodiments, the system 100 may be installed in any manner that enables the system 100 to operate as described. For example, in some embodiments, the first pad 118 and/or the second pad 120 may be attached to the flashing 108 simultaneously or after positioning the flashing 108 on the surface 102. In other embodiments, the first pad 118 and/or the second pad 120 do not include adhesives and compression of the first pad 118 and/or the second pad 120 provides the water-resistant seal without adhesive.

Figure 7:
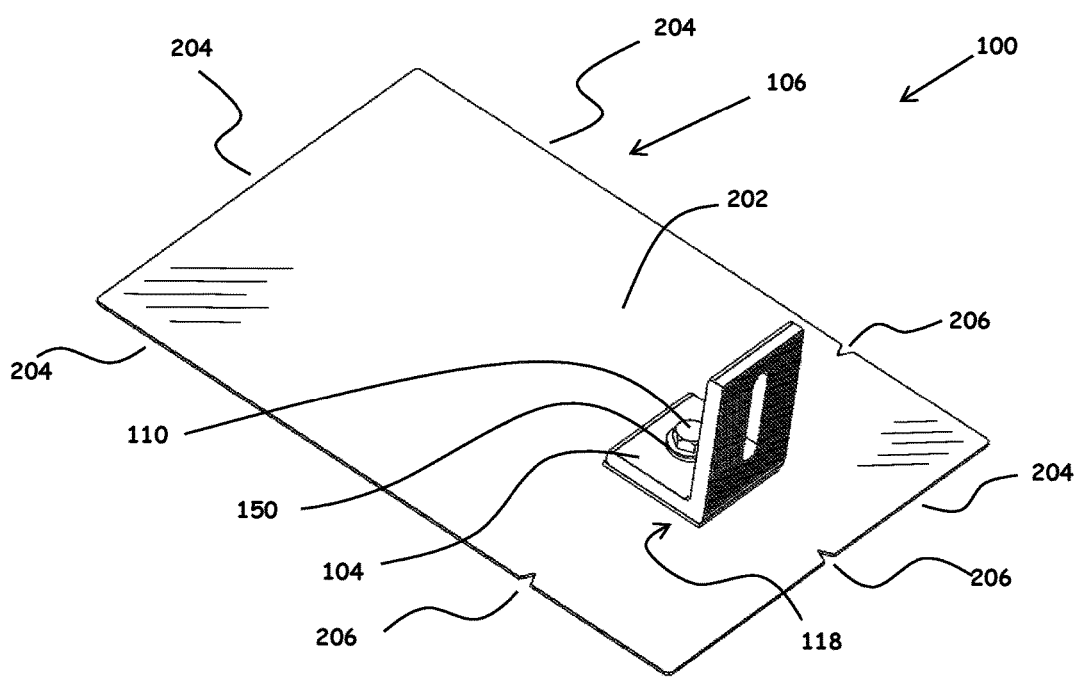
FIG. 7 is a perspective view of an embodiment of a system including flashing with notches.

FIG. 7 is a perspective view of an embodiment of the system 100 showing the flashing assembly 106 including notched flashing 202. The flashing 202 is rectangular and includes four edges 204. At least one notch, broadly a location feature, 206 is positioned along at least one edge 204 of the flashing 202. In the example, the flashing 202 includes three notches 206. Each notch 206 is aligned with the opening (not shown in FIG. 4) of the flashing 202. The notches 206 allow an operator to position the flashing assembly 106 in a target location on the surface 102 (shown in FIG. 6). In addition, the notches 206 allow the operator to align the mount 104 and/or the fastener 110 with the opening 116. In other embodiments, the flashing 108 may include marks, projections, and/or any other suitable location features.

Figure 8:
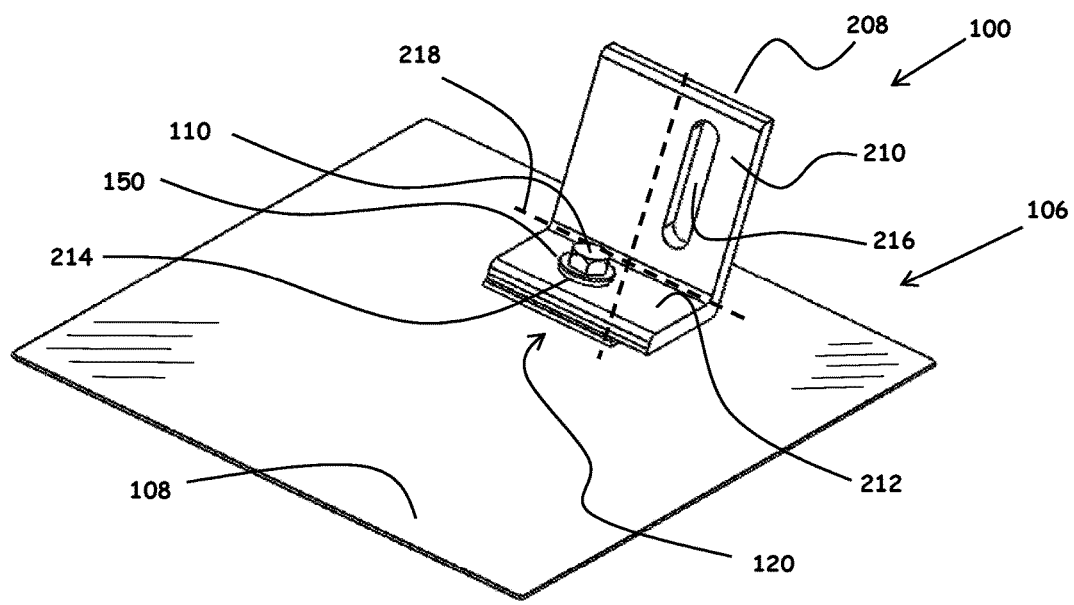
FIG. 8 is a perspective view of an embodiment of a flashing assembly and a mount.

FIG. 8 is a perspective view of an embodiment of the flashing assembly 106 and a mount 208. The mount 208 includes a first plate 210 and a second plate 212. The first plate 210 and the second plate 212 are joined along edges to form an L-shape. The first plate 210 includes an opening 214 sized to receive the fastener 110. The second plate 212 includes a slot 216 sized to receive a fastener (not shown in FIG. 8) for securing a PV module and/or PV module support system to the mount 208. An axis 218 extends along the joint between the first plate 210 and the second plate 212. The opening 214 and the slot 216 are offset along the axis 218. The offset distance between the opening 214 and the slot 216 may provide clearance for use of tools when the mount 208 and PV modules are secured to the surface 102 (shown in FIG. 6). In other embodiments, the mount 208 may include any openings that enable the mount 208 to function as described.

The first pad 118 and the second pad 120 allow the flashing assembly 106 to accommodate different mounts such as the mount 208 and the mount 104 (shown in FIG. 1) because the pads 118, 120 can extend across and seal any openings in the flashing 108 that are provided to accommodate the different mounts 104, 208. Moreover, the first pad 118 and the second pad 120 may extend along only a portion of the mount 208 and may have a size different from the size of the mount 208 and/or the flashing 108. Accordingly, the first pad 118 and the second pad 120 are modular and may be used with different flashing assemblies 106, flashings 108, and mounts 104.

Figure 9:
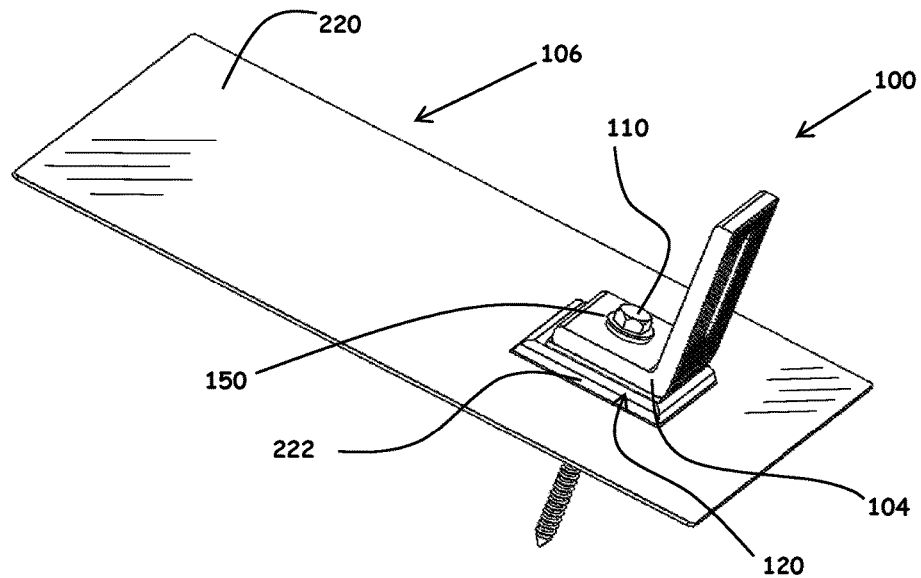
FIG. 9 is a perspective view of an embodiment of a system including flashing with a raised interface for receiving a mount.
Figure 10:
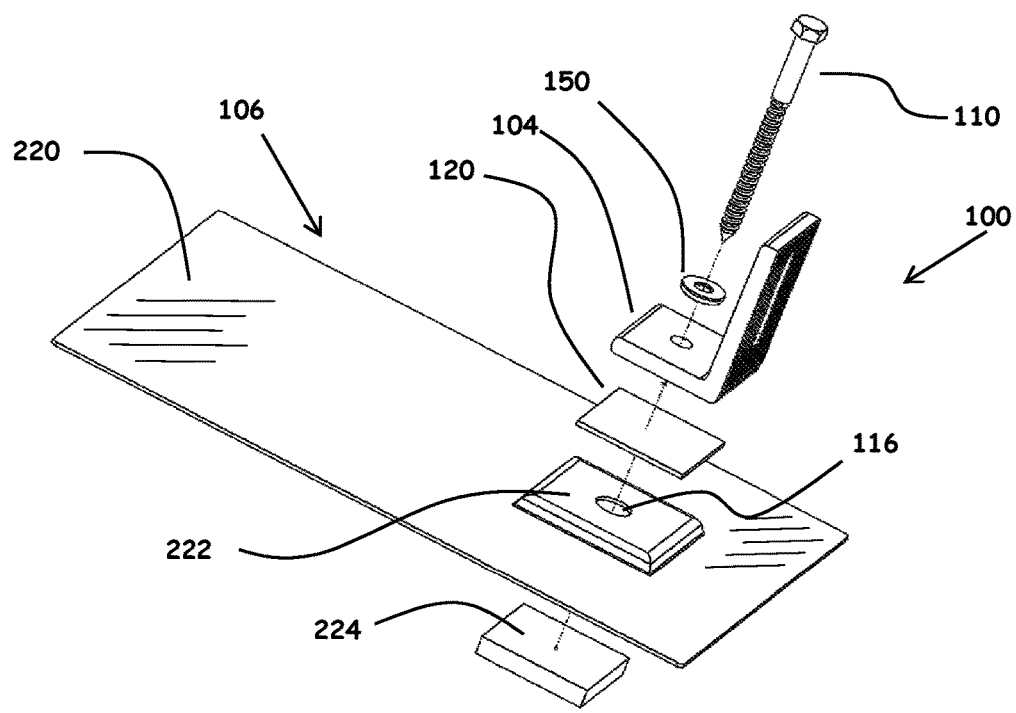
FIG. 10 is an exploded view of the system shown in FIG. 9.
Figure 11:
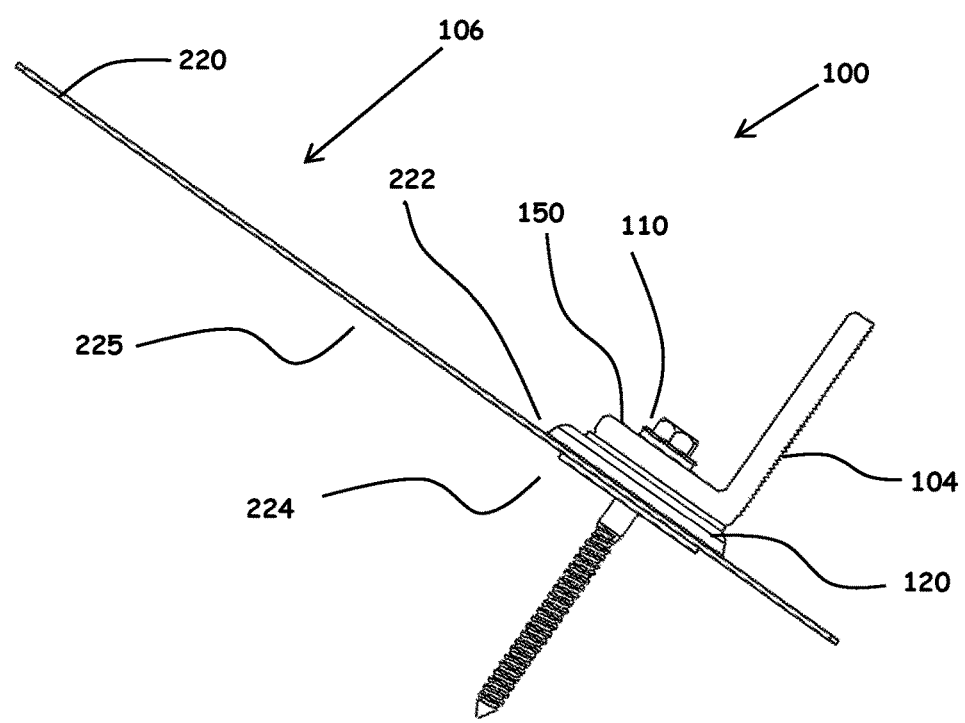
FIG. 11 is a side view of the system shown in FIG. 9.

FIG. 9 is a perspective view of an embodiment of the system 100 including flashing 220 with a raised interface 222 for receiving the mount 104. FIG. 10 is an exploded view of the system 100 including the flashing 220. FIG. 11 is a side view of the system 100 including the flashing 220. The raised interface 222 raises the opening 116 and the mount 104 a distance from the planar surface of the flashing 220 and from the surface 102 (shown in FIG. 6). Accordingly, the raised interface 222 positions the opening 116 out of the path of water to inhibit water intrusion through the opening 116. In some embodiments, the raised interface 222 may be stamped into the flashing 220 and define a recess on the underside of the flashing 220. In other embodiments, the flashing 220 may include any raised interface 222 that enables the flashing to function as described. For example, in some embodiments, the flashing 220 and the raised interface 222 may be formed separately and attached together. In other embodiments, a block or support may be positioned on or attached to the flashing 220 to space the mount 104 from the flashing 220.

In the example, a first pad 224 is positioned on a lower surface 225 (shown in FIG. 11) of the flashing 220 and extends into the recess of the raised interface 222. The first pad 224 has an increased thickness in comparison to the first pad 118 (shown in FIG. 1). Specifically, the first pad 224 is sized to extend from the recess and be compressed when the flashing 220 is secured to the surface 102 (shown in FIG. 6). The first pad 224 is rectangular and corresponds to a shape of the recess. In addition, the first pad 224 extends across the opening 116 when the first pad 224 is positioned in the recess. In other embodiments, the flashing assembly 106 may include any first pad 224 that enables the flashing assembly 106 to operate as described. For example, in some embodiments, the first pad 224 is sized to extend across the opening 116 and does not necessarily fill or extend from the recess.

Figure 12:
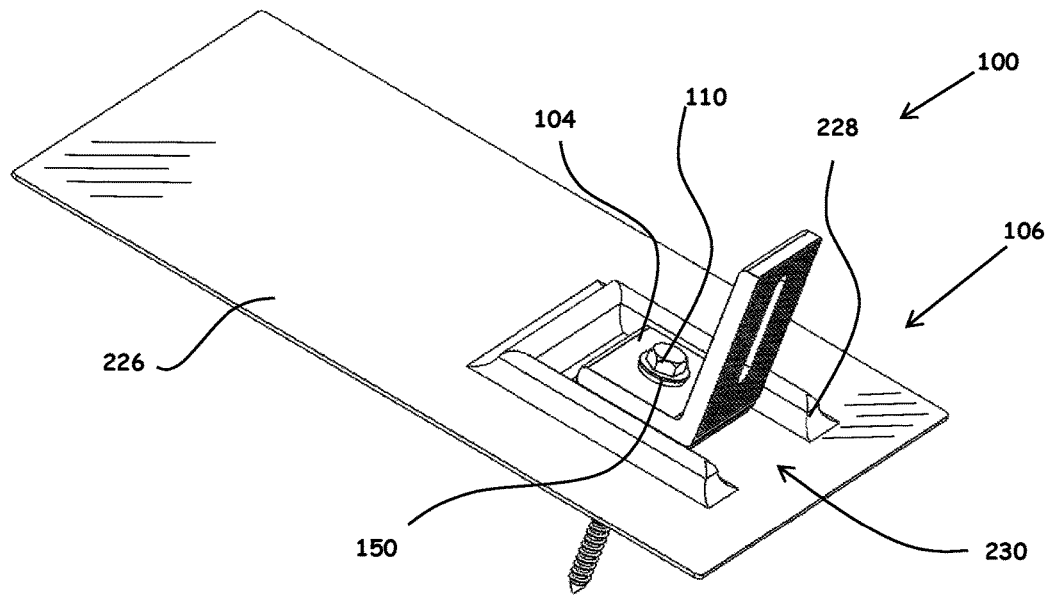
FIG. 12 is a perspective view of an embodiment of a system including a flashing assembly including a water deflection device.

FIG. 12 is a perspective view of an embodiment of the system 100 including the flashing 226 including a water deflection structure 228. The water deflection structure 228 extends partially around the mount 104 and the opening 116 and is raised from the planar portion of flashing 226. Accordingly, the water deflection structure 228 inhibits water from flowing towards the opening 116. The water deflection structure 228 defines a gap 230 that is downslope from the opening 116. Any water that is able travel upslope and through the gap 230 towards the opening 116 will be prevented from intruding into the structure through the opening 116 because the first pad 224 seals the opening 116.

Figure 13:
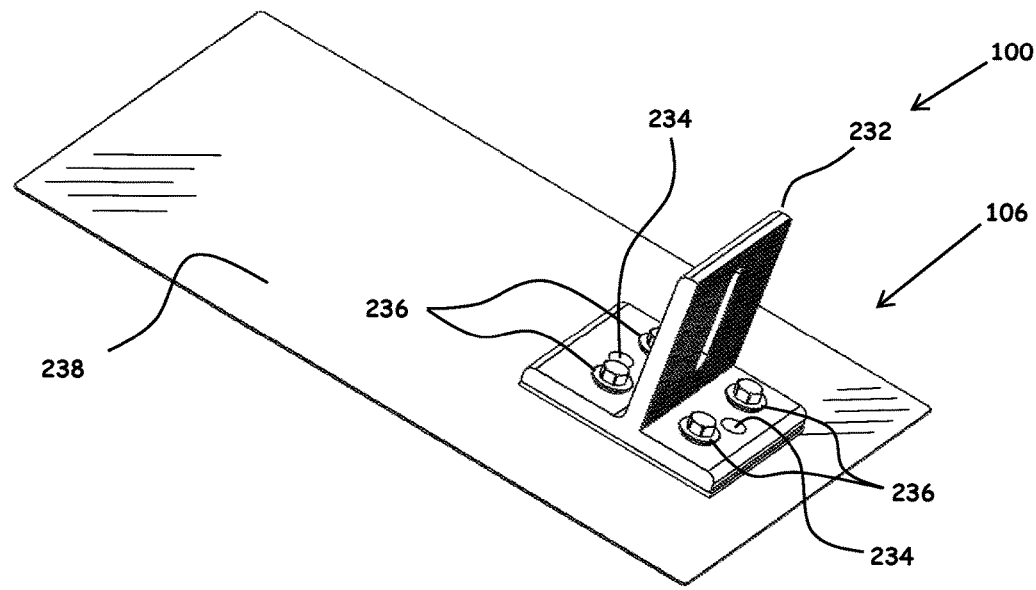
FIG. 13 is a perspective view of an embodiment of a flashing assembly being used with a mount in a "direct-to-deck attachment" configuration.
Figure 14:
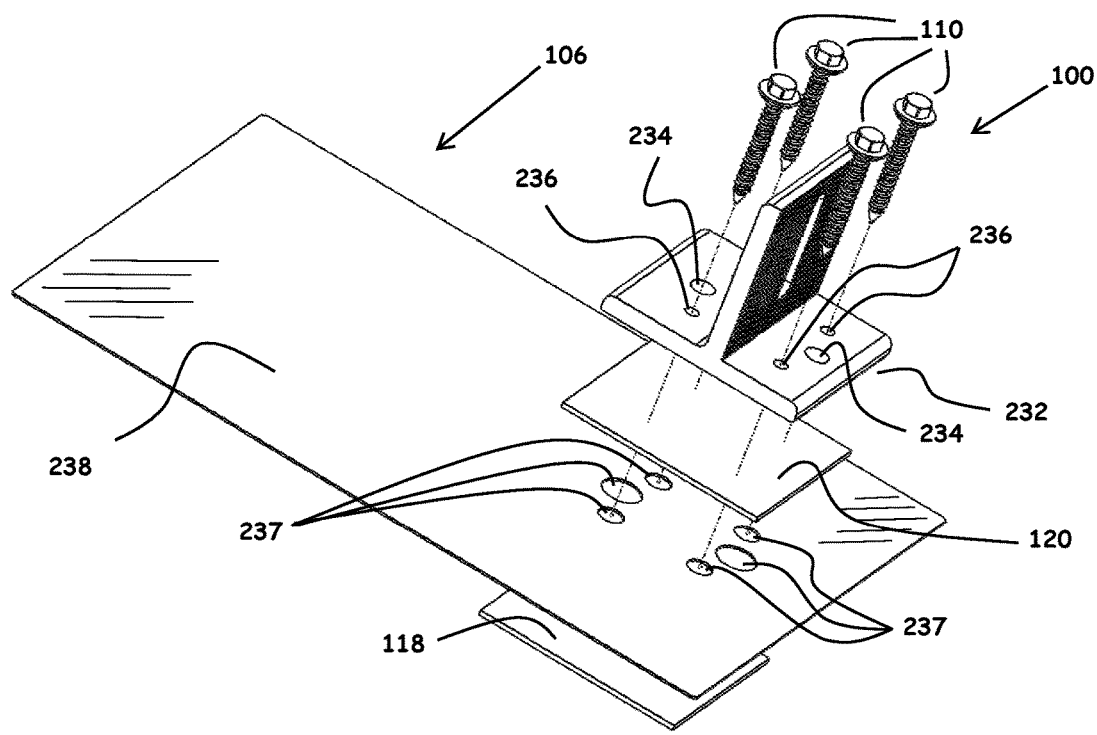
FIG. 14 is an exploded view of the flashing assembly shown in FIG. 13.
Figure 15:
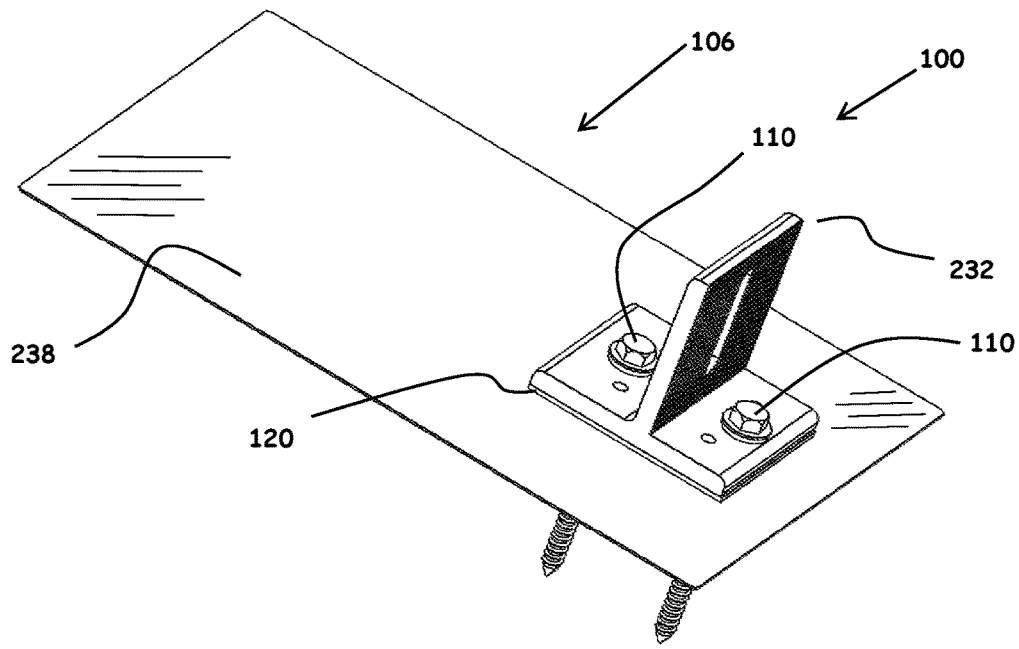
FIG. 15 is a perspective view of the flashing assembly shown in FIGS. 13 and 14 being used with a mount in a "rafter attachment" configuration.

With reference to FIGS. 13-15, the flashing assembly 106 may be used with a mount 232 having different configurations. For example, FIGS. 13 and 14 show the flashing assembly 106 in use with a mount 232 in a first, a "direct-to-deck attachment" configuration. FIG. 15 shows the flashing assembly 106 in use with the mount 232 in a second, "rafter attachment" configuration. The mount 232 includes middle openings 234 and outer openings 236. The middle openings 234 are aligned along a center axis of the mount 232 and receive the fasteners 110 when the mount 232 is in the second configuration. The outer openings 236 are spaced along the periphery of the mount 104 and receive the fasteners 110 when the mount 232 is in the first configuration. The mount includes two middle openings 234 and four outer openings 236. The flashing 238 includes openings 237. Each opening 237 is aligned with an opening 234, 236 and receives the fastener 110 when the fastener 110 is positioned in the respective opening 234, 236. In other embodiments, the mount 232 and the flashing 238 may include any opening 234, 236, 237 that enables the system to function as described.

The first pad 118 and the second pad 120 allow the mount 104 to be used in the first configuration and the second configuration because the first pad 118 and the second pad 120 extend across and seal each of the openings 237. Accordingly, the openings 237 are sealed by the first pad 118 and the second pad 120 when the fasteners 110 are positioned in the openings 237 and when the fasteners 110 are not positioned in the openings 237. Accordingly, the first pad 118 and the second pad 120 allow the flashing assembly 106 to be modular and be used with different mounts 104, 232 having different configurations. In contrast, known systems require different and/or additional components to accommodate different configurations. For example, known systems require additional components to cover the openings in the flashing and/or in the mount for any unused fastener locations.

Figure 16:
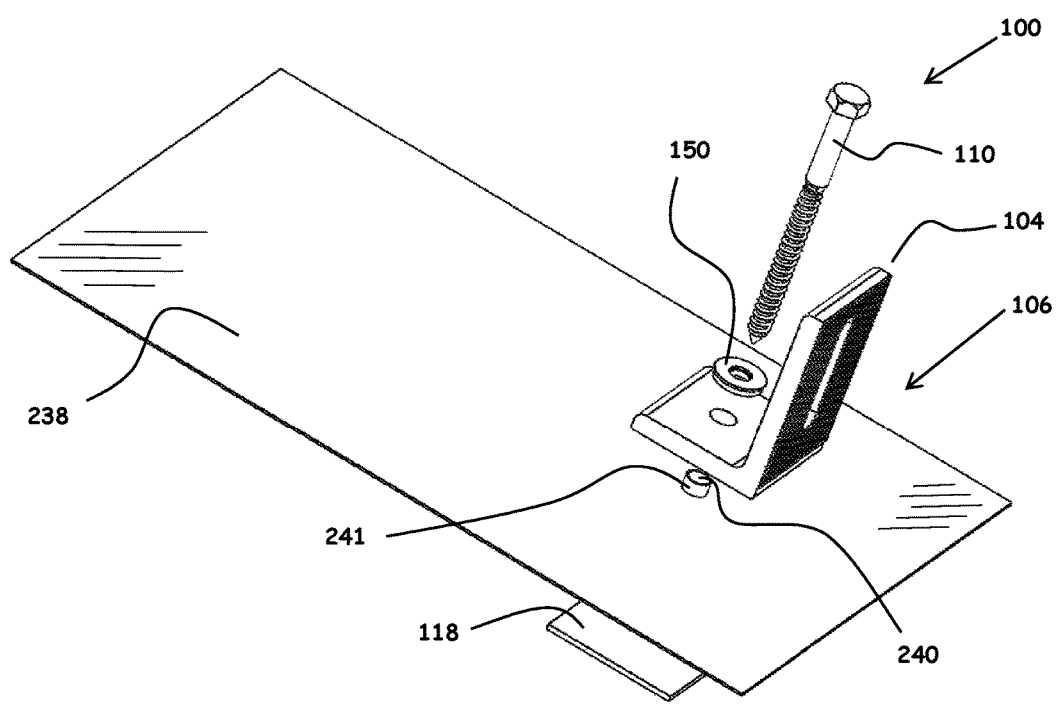
FIG. 16 is an exploded view of an embodiment of a system including flashing having an elevated opening.

FIG. 16 is an exploded view of an embodiment of the system 100 including a flashing 238 including a raised opening 240. An extension 241 extends from the flashing 238 and defines the opening 240. The extension 241 is sized to extend into the opening in the mount 104. The extension 241 inhibits water intrusion through the opening 240. The first pad 118 extends between the flashing 238 and the surface 102 (shown in FIG. 6) and provides a seal on the underside of the flashing 238 to the surface 102. In addition, the fastener 110 extends through the opening 240, passes through the first pad 118, and is sealed when the fastener 110 is secured to the surface 102 (shown in FIG. 6). Accordingly, the first pad 118 provides an additional and automatic double sealing (between surfaces 102 and flashing 238 and around the fastener 110) which provides a more reliable seal than products with only raised openings. In other embodiments, the flashing assembly 106 may include any flashing 238 that enables the flashing assembly 106 to function as described.

Figure 17:
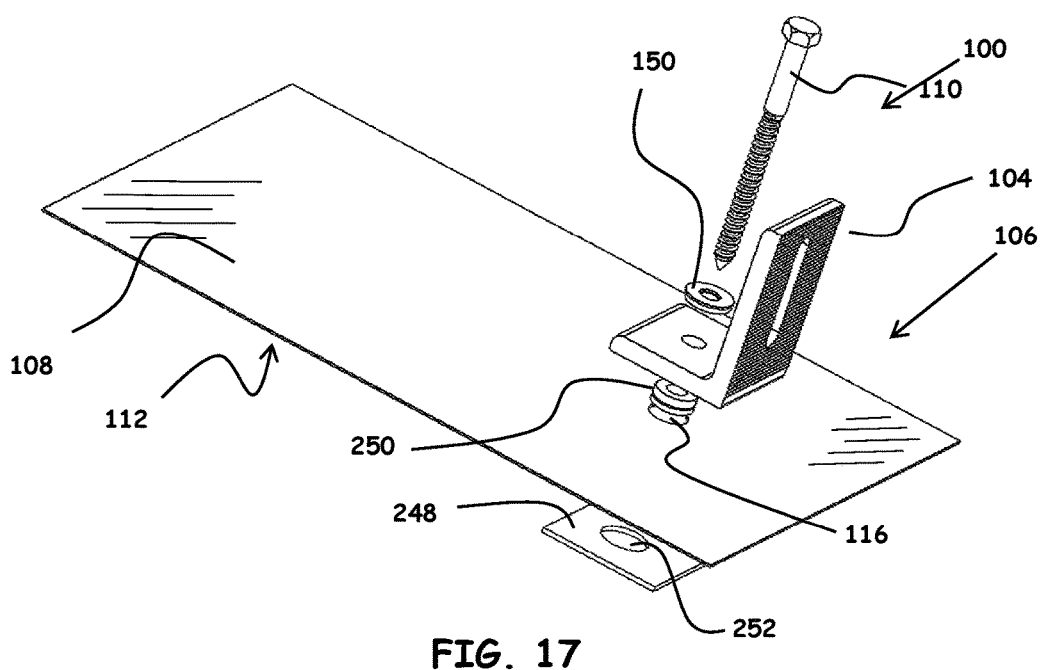
FIG. 17 is an exploded view of an embodiment of a system including a pad and a grommet, the pad including an opening.
Figure 18:
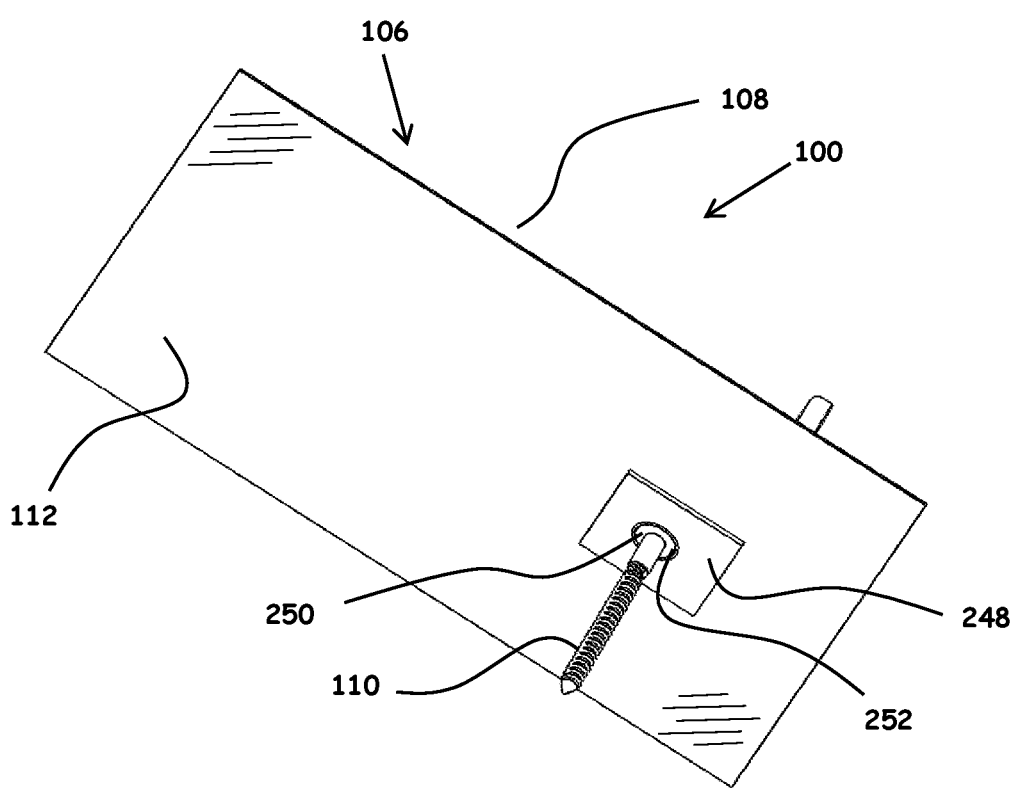
FIG. 18 is a perspective view of an underside of the flashing assembly shown in FIG. 17.

FIG. 17 is an exploded view of an embodiment of the system 100 including a pad 248 and a grommet 250. FIG. 18 is a perspective view of the lower surface 112 of the flashing 108 shown in FIG. 17. The grommet 250 is positioned at least partially in the opening 116 and seals around the fastener 110 when the fastener 110 is positioned in the opening 116. The pad 248 is positioned on the lower surface 112 of the flashing 108. The pad 248 defines an opening 252 that is aligned with the opening 116 in the flashing 108. In addition, the opening 252 is larger than the opening 116 in the flashing 108. Accordingly, the pad 248 accommodates the grommet 250 in the opening 116. In addition, the pad 248 provides a seal between the flashing 108 and the surface 102 (shown in FIG. 6) and a raised platform to prevent flashing warpage when the fastener 110 is tightened to a final position. This is an improvement over known systems including grommets because the pad 248 provides an automatic and reliable sealing between the roofing surface 102 and the flashing 108 and removes the need for additional field applied sealant between these surfaces which is required by known systems.

Figure 19:
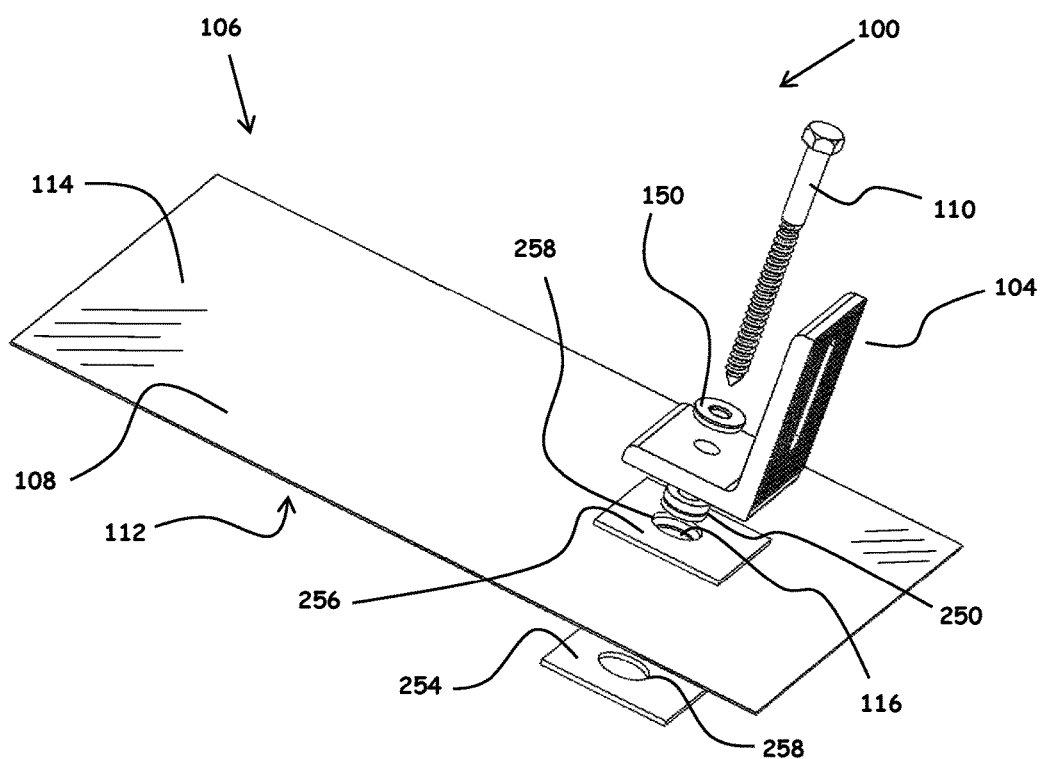
FIG. 19 is an exploded view of an embodiment of a system including a first pad on a lower surface of a flashing and a second pad on an upper surface of the flashing.

FIG. 19 is an exploded view of an embodiment of the system 100 including a first pad 254 on a lower surface 112 of the flashing 108 and a second pad 256 on the upper surface 114 of the flashing 108. The flashing assembly 106 also includes the grommet 250 positioned at least partially in the opening 116. The first pad 254 and the second pad 256 each include an opening 258. The openings 258 are aligned with the opening 116 in the flashing 108 and are sized to accommodate the grommet 250. The first pad 254 and the second pad 256 provide seals between the lower surface 112 and the surface 102 (shown in FIG. 6) and between the upper surface 114 and the mount 104. The grommet 250 provides a seal around the fastener 110 when the grommet 250 and the fastener 110 are positioned within the opening 116. In other embodiments, the flashing assembly 106 may include any seals that enable the flashing assembly 106 to operate as described. For example, in some embodiments, at least one of the first pad 254, the second pad 256, and the grommet 250 is omitted. This approach is an improvement over current systems including grommets because the flashing assembly 106 provides (1) a raised platform, (2) an automatic seal between the roofing surface 102 and the flashing 108, and (3) a robust water seal between the mount 104 and the flashing 108. Accordingly, the flashing assembly 106 provides an additional water seal either to supplement the grommet or replace the requirement of the grommet to provide a seal at this interface.

Figure 28:
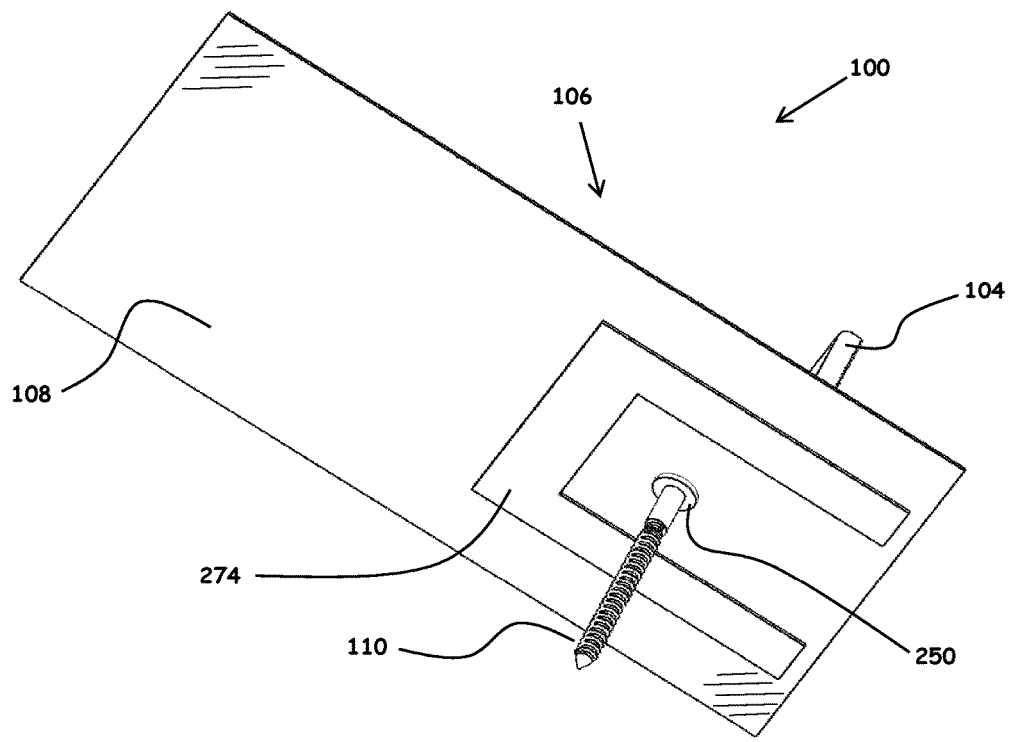
FIG. 28 is a perspective view of a system including a flashing assembly including a U-shaped adhesive pad.

As shown in FIG. 28, a u-shaped pad 274 can be used and applied to the flashing assembly 106. This provides a vast improvement to field applied sealant and will work with many current technologies to create a faster and cleaner installation and a more cost effective solution. The u-shaped pad 274 extends around the opening 116 and inhibits water intrusion into the structure through penetrations. The u-shaped pad 274 defines a gap down flow of the opening 116 to allow any water to escape. In contrast, current systems include a field-applied sealant between the surface 102 and the flashing 108 at the time of installation to prevent wind driven rain or lateral water flow from traveling under the flashing 108 and into the penetration in the surface. However, the systems including field-applied sealant suffer from problems of requiring additional materials and tools, the messy nature of field applied sealants, and material compatibility. The u-shaped pad 274 allows field-applied sealants to be omitted and is compatible with a variety of systems.

Embodiments of the methods and systems described achieve superior results compared to prior methods and systems. For example, the systems and methods described provide a complete water-resistant seal for a flashing assembly. In addition, the embodiments simplify the installation of PV modules on structures. More specifically, the embodiments reduce the labor, tools, and materials required for creating a water-resistant seal on a surface at the mount locations of the PV modules. Also, the systems and methods described may provide a more robust and consistent seal at each mount location.

In addition, embodiments of the methods and systems described can be used with different mounts and different attachment configurations because the pads seal all openings in the flashing. Accordingly, the embodiments reduce the cost to install flashing and reduce the risk of failures and leaks of the flashing. Also, the embodiments may reduce the training and/or experience required to properly install the flashing.

Embodiments of the described methods and systems are not limited to use with photovoltaic assemblies. Rather, embodiments of the methods and systems described may be used for flashing assemblies on any roofing surface. For example, the methods and systems may be used for penetrations in roofs such as vents and/or mechanical attachments that extend through the roof.

When introducing elements of the present invention or the embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A system for flashing a mount of a photovoltaic assembly on a surface, the system comprising:
   a flashing including a lower surface and an upper surface, the flashing defining an opening to receive a fastener for securing the mount to the surface;
   a first pad positioned along and attached to the lower surface, wherein the first pad extends across the opening; and
   a second pad positioned along and attached to the upper surface, wherein the second pad extends across the opening, wherein the first pad and the second pad include an adhesive and form a water-resistant seal for the opening, the first pad and the second pad being attached to the flashing in a pre-installation configuration of the system, wherein the first pad and the second pad contact each other at the opening and bond together in the pre-installation configuration of the system.

2. The system of claim 1, wherein the first pad is compressible and forms a water-resistant seal between the surface and the flashing when the mount is secured to the surface using the fastener.

3. The system of claim 2, wherein the second pad is compressible and forms a water-resistant seal between the flashing and the mount when the mount is secured to the surface using the fastener.

4. The system of claim 1, wherein the fastener has a first diameter, the opening having a second diameter at least 20% greater than the first diameter.

5. The system of claim 1, wherein the first pad includes a first attachment surface and a second attachment surface opposite the first attachment surface, the first attachment surface being attached to the lower surface and forming a seal with the lower surface.

6. The system of claim 5, wherein the second pad includes a third attachment surface and a fourth attachment surface opposite the third attachment surface, the third attachment surface being attached to the upper surface and forming a seal with the upper surface.

7. The system of claim 6, wherein the second attachment surface is attached to the surface and forms a seal with the surface when the mount and the flashing are connected to the surface.

8. The system of claim 7, wherein the fourth attachment surface is attached to the mount and forms a seal with the mount when the mount and the flashing are connected to the surface.

9. The system of claim 1, wherein the fastener extends through the first pad and the second pad to secure the mount to the surface, wherein the first pad and the second pad form the water-resistant seal around the fastener when the fastener is positioned in the opening.

10. A system for flashing a mount of a photovoltaic assembly on a surface, the system comprising:
    a flashing including a lower surface and an upper surface, the flashing defining an opening to receive a fastener for securing the mount to the surface;
    a first pad positioned along and attached to the lower surface, wherein the first pad extends across the opening; and
    a second pad positioned along and attached to the upper surface, wherein the second pad extends across the opening, wherein the first pad and the second pad include an adhesive and form a water-resistant seal for the opening, wherein the flashing defines at least one additional opening to receive the fastener, the first pad and the second pad extending across each opening of the flashing.

11. The system of claim 10, wherein the mount has a first attachment configuration and a second attachment configuration, and wherein the first pad and the second pad seal each opening when the mount is secured to the surface in the first attachment configuration and the second attachment configuration.

12. A system for flashing a mount of a photovoltaic assembly on a surface, the system comprising:
    a flashing including a lower surface and an upper surface, the flashing defining an opening to receive a fastener for securing the mount to the surface;
    a first pad positioned along and attached to the lower surface, wherein the first pad extends across the opening; and a second pad positioned along and attached to the upper surface, wherein the second pad extends across the opening, wherein the first pad and the second pad include an adhesive and form a water-resistant seal for the opening, wherein a release sheet covers the adhesive to prevent the adhesive from attaching to objects prior to installation.

13. The system of claim 12, wherein the first pad and second pad are attached to the flashing in a pre-installation configuration of the system, wherein the first pad and the second pad contact each other at the opening and bond together in the pre-installation configuration of the system.

14. The system of claim 12, wherein the fastener extends through the first pad and the second pad to secure the mount to the surface, wherein the first pad and the second pad form the water-resistant seal around the fastener when the fastener is positioned in the opening.

15. The system of claim 12, wherein the fastener has a first diameter, the opening having a second diameter at least 20% greater than the first diameter.

16. The system of claim 10, wherein the first pad and the second pad are attached to the flashing in a pre-installation configuration of the system, wherein the first pad and the second pad contact each other at the opening and bond together in the pre-installation configuration of the system.

17. The system of claim 10, wherein the fastener extends through the first pad and the second pad to secure the mount to the surface, wherein the first pad and the second pad form the water-resistant seal around the fastener when the fastener is positioned in the opening.

18. The system of claim 10, wherein the fastener has a first diameter, the opening having a second diameter at least 20% greater than the first diameter.

\* \* \* \* \*